United States Patent
Tomonaga et al.

(10) Patent No.: US 11,809,796 B2
(45) Date of Patent: Nov. 7, 2023

(54) SUPPORT DEVICE AND STORAGE MEDIUM

(71) Applicant: Mitsubishi Electric Corporation, Tokyo (JP)

(72) Inventors: Kenta Tomonaga, Tokyo (JP); Tomo Horikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 139 days.

(21) Appl. No.: 17/417,383

(22) PCT Filed: Jan. 9, 2020

(86) PCT No.: PCT/JP2020/000443
§ 371 (c)(1),
(2) Date: Feb. 2, 2022

(87) PCT Pub. No.: WO2020/174888
PCT Pub. Date: Sep. 3, 2020

(65) Prior Publication Data
US 2022/0198113 A1 Jun. 23, 2022

(30) Foreign Application Priority Data
Feb. 27, 2019 (WO) .................. PCT/JP2019/007671

(51) Int. Cl.
*G06F 30/3323* (2020.01)
*G06F 30/367* (2020.01)
*G06F 30/337* (2020.01)

(52) U.S. Cl.
CPC ........ *G06F 30/3323* (2020.01); *G06F 30/337* (2020.01); *G06F 30/367* (2020.01)

(58) Field of Classification Search
CPC .. G06F 30/3323; G06F 30/337; G06F 30/367; G06F 30/27; G06F 2119/20;
(Continued)

(56) References Cited

U.S. PATENT DOCUMENTS 7,603,183 B1 * 10/2009 Munemoto .......... G05B 19/056
700/83
9,910,643 B2 * 3/2018 Udou ........................ G06F 8/34
(Continued)

FOREIGN PATENT DOCUMENTS

JP 2003-44108 A 2/2003
JP 2011-113254 A 6/2011
(Continued)

OTHER PUBLICATIONS

International Search Report and Written Opinion dated Mar. 17, 2020, received for PCT Application PCT/JP2020/000443, Filed on Jan. 9, 2020, 16 pages including English Translation.

*Primary Examiner* — Nha T Nguyen
(74) *Attorney, Agent, or Firm* — XSENSUS LLP

(57) ABSTRACT

A design support device includes an operation reception unit that receives an operation from a user, a program creation unit that creates a ladder program in accordance with the operation received by the operation reception unit, and a circuit block extraction unit that extracts a circuit block from the ladder program when the circuit block is formed and a predetermined condition is satisfied. The circuit block is formed by detecting that one end of a circuit including a plurality of program elements is connected to one of two power rails included in the ladder program and that another end of the circuit is connected to another one of the two power rails. Further, there is a circuit block memory that stores configuration information of the circuit block extracted by the circuit block extraction unit. There is also a notification unit.

20 Claims, 19 Drawing Sheets

(58) Field of Classification Search
CPC .... G06F 30/343; G06F 3/04817; G06F 30/31; G06F 3/0486; G05B 19/05; G05B 19/056
See application file for complete search history.

(56) References Cited

U.S. PATENT DOCUMENTS

| | | | |
|---|---|---|---|
| 10,243,566 B2* | 3/2019 | Mochizuki | H03K 19/17764 |
| 10,565,010 B2* | 2/2020 | Matsuo | G06F 9/4881 |
| 10,719,643 B2* | 7/2020 | Horikawa | G05B 19/05 |
| 11,073,818 B2* | 7/2021 | Nagao | G05B 19/056 |
| 11,320,976 B2* | 5/2022 | Iwamura | G06F 3/0484 |
| 11,378,928 B2* | 7/2022 | Iwamura | G05B 19/056 |
| 2014/0229911 A1* | 8/2014 | Inamoto | G06F 3/0488 |
| | | | 717/105 |
| 2015/0094829 A1 | 4/2015 | Iwatsu | |
| 2015/0286204 A1 | 10/2015 | Yamaoka et al. | |
| 2016/0004242 A1* | 1/2016 | Yamaoka | G05B 19/056 |
| | | | 700/86 |
| 2016/0034259 A1* | 2/2016 | Yamaoka | G06F 8/30 |
| | | | 717/107 |
| 2016/0196118 A1 | 7/2016 | Udou | |
| 2020/0225634 A1* | 7/2020 | Iwamura | G05B 19/056 |

FOREIGN PATENT DOCUMENTS

| | | |
|---|---|---|
| JP | 2012-14561 A | 1/2012 |
| WO | 2013/038541 A1 | 3/2013 |
| WO | 2013/140497 A1 | 9/2013 |
| WO | 2014/080490 A1 | 5/2014 |
| WO | 2014/155717 A1 | 10/2014 |
| WO | 2015/025382 A1 | 2/2015 |

* cited by examiner

| | | |
|---|---|---|
| 0,0 | ─┤├─ | |
| 0,1 | ─┤├─ | 83A |
| 1,0 | ─○─ | |
| 1,1 | NONE | |
| EXTRACTION COUNT | 1 | 83B |

| X0 | 1 |
| --- | --- |
| X1 | 1 |
| X2 | 0 |
| X3 | 0 |
| ⋮ | ⋮ |

| Y0 | 1 |
| --- | --- |
| Y1 | 0 |
| Y2 | 0 |
| Y3 | 0 |
| ⋮ | ⋮ |

USED DEVICE TABLE

START
↓
RECEIVE START OPERATION FOR MULTIPLE INPUTS OF PROGRAM ELEMENTS — S21
↓
DISPLAY CIRCUIT BLOCKS WITH HIGH USAGE COUNTS AS INPUT CANDIDATES — S22
↓
RECEIVE OPERATION OF SELECTING CIRCUIT BLOCK — S23
↓
INSERT CIRCUIT BLOCK INTO LADDER PROGRAM — S24
↓
END

SUPPORT DEVICE AND STORAGE MEDIUM

CROSS-REFERENCE TO RELATED APPLICATIONS

The present application is based on PCT filing PCT/JP2020/000443, filed Jan. 9, 2020, which claims priority to JP PCT/JP2019/007671, filed Feb. 27, 2019, the entire contents of each are incorporated herein by reference.

FIELD

The present invention relates to a design support device, a design support method, and a design support program, the design support device supporting the work of designing a ladder program executed by a programmable logic controller (PLC) that performs sequence control.

BACKGROUND

A ladder program is a program written in a ladder language. In programming using the ladder language, a program is created by placing program elements that propagate a control signal such as a contact and a coil between two power rails, and specifying the connection relationship between the program elements. Note that the control signal is assigned to an internal memory of the PLC, and the internal memory is called a "device".

Here, the ladder program can be said to be a combination of a plurality of small circuits each including a plurality of program elements. Also, among the small circuits included in the ladder program, there is usually a plurality of the small circuits having the same circuit configuration, that is, having the same connection relationship between the program elements included in the circuit. In other words, the work of designing the ladder program involves the work of inputting the small circuit having the same configuration multiple times. Given this situation, Patent Literature 1 proposes a technique that enables efficient input of the small circuit having the same configuration.

In the invention described in Patent Literature 1, when the work of copying and pasting a plurality of program elements that has been input is to be executed, the plurality of program elements to be pasted is stored as history information. Then, in the invention described in Patent Literature 1, the plurality of stored program elements is called, edited as necessary, and then registered as a program component. The registered program component can be used in the subsequent work of editing the ladder program. That is, a user who edits the ladder program pastes the registered program component into the ladder program, thereby inputting, at a time, the plurality of program elements included in the program component.

CITATION LIST

Patent Literature

Patent Literature 1: Japanese Patent Application Laid-open No. 2011-113254

SUMMARY

Technical Problem

Unfortunately, in the invention described in Patent Literature 1, in order to repeatedly input a program element group (the plurality of program elements stored as the history information) having the same connection relationship, the plurality of program elements stored needs to be made into the program component and registered in advance, which takes time and effort.

The present invention has been made in view of the above, and an object of the present invention is to provide a design support device capable of reducing the burden on an operator who designs a ladder program.

Solution to Problem

In order to solve the above problem and achieve the object, a design support device according to the present invention comprises: an operation reception unit to receive an operation from a user; and a program creation unit to create a ladder program in accordance with the operation received by the operation reception unit. The design support device further comprises: a circuit block extraction unit to extract a circuit block from the ladder program when the circuit block is formed and a predetermined condition is satisfied, the circuit block being formed by detecting that one end of a circuit including a plurality of program elements is connected to one of two power rails included in the ladder program and that another end of the circuit is connected to another one of the two power rails; and a circuit block storage unit to store configuration information representing a configuration of the circuit block extracted by the circuit block extraction unit. The design support device further comprises a notification unit to notify the user of the circuit block represented by the configuration information stored in the circuit block storage unit, as a candidate for a circuit block to be inserted into the ladder program.

Advantageous Effects of Invention

The design support device according to the present invention can reduce the burden on the operator who designs the ladder program.

DESCRIPTION OF EMBODIMENTS

Hereinafter, a design support device, a design support method, and a design support program according to embodiments of the present invention will be described in detail with reference to the drawings. Note that the present invention is not limited to the embodiments.

First Embodiment

Figure 1:
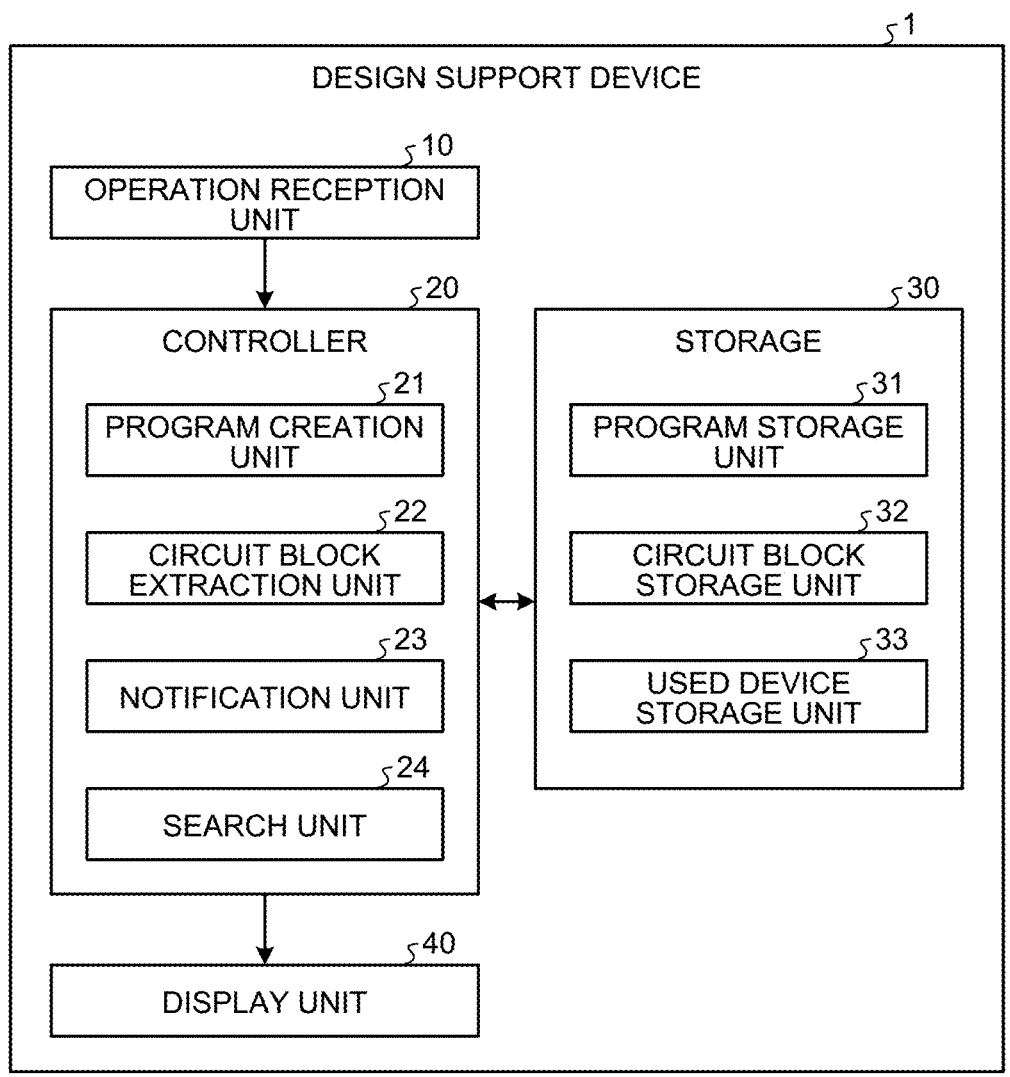
FIG. 1 is a diagram illustrating an example of the configuration of a design support device according to a first embodiment.

FIG. 1 is a diagram illustrating an example of the configuration of a design support device according to a first embodiment. As illustrated in FIG. 1, a design support device 1 according to the first embodiment includes an operation reception unit 10, a controller 20, a storage 30, and a display unit 40.

The operation reception unit 10 receives an operation from a user who is an operator designing a ladder program using the design support device 1.

The controller 20 includes a program creation unit 21, a circuit block extraction unit 22, a notification unit 23, and a search unit 24.

Figure 2:
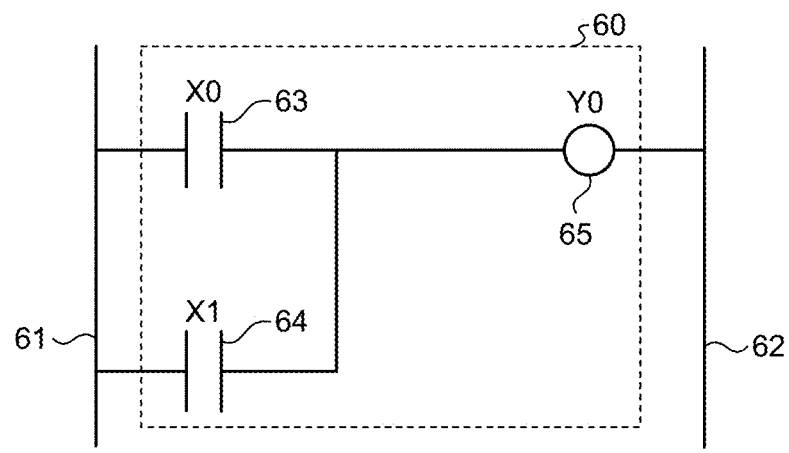
FIG. 2 is a diagram illustrating an example of a ladder program created by the design support device according to the first embodiment.

The program creation unit 21 creates a ladder program in accordance with the content of an operation that the operation reception unit 10 receives from the user. The program creation unit 21 creates the ladder program as illustrated in FIG. 2, for example. FIG. 2 is a diagram illustrating an example of the ladder program created by the design support device 1 according to the first embodiment. The ladder program illustrated in FIG. 2 includes a contact 63, a contact 64, and a coil 65 sandwiched between a left power rail 61 and a right power rail 62. Devices (X0, X1, Y0) are assigned to the contact 63, the contact 64, and the coil 65, respectively. The devices (X0, X1, Y0) are internal memories of a PLC, and the contact 63, the contact 64, and the coil 65 are program elements. The assumption is that the program creation unit 21 automatically assigns the device to each program element.

Hereinafter, a circuit including the contact 63, the contact 64, and the coil 65 is defined as a circuit block 60. In the present description, a circuit including a plurality of program elements and connected to both of two power rails (the left power rail 61 and the right power rail 62) of a ladder program is referred to as a circuit block. More specifically, a circuit, which is defined by a plurality of program elements and forms one of a plurality of current paths formed between the left power rail 61 and the right power rail 62, is referred as to a circuit block.

The circuit block extraction unit 22 extracts the circuit block from the ladder program created by the program creation unit 21, and generates circuit block information that is information representing the extracted circuit block. The circuit block information is held in a circuit block storage unit 32 of the storage 30 described later. Moreover, the circuit block extraction unit 22 generates information on the device used for each of the plurality of program elements included in the extracted circuit block. The information on the device is held in a used device storage unit 33 of the storage 30 described later.

When the operation reception unit 10 receives an operation of starting to input the circuit block, the notification unit 23 notifies the user of the circuit block that can be input, that is, the circuit block held in the circuit block storage unit 32 of the storage 30. The notification unit 23 causes the display unit 40 to display the circuit block held in the circuit block storage unit 32, thereby notifying the user of this circuit block. In notifying the user of the circuit block, the notification unit 23 also causes the display unit 40 to display the devices assigned to the program elements included in the circuit block.

When the operation reception unit 10 receives a search operation for the circuit block, the search unit 24 search the circuit blocks represented by the information held in the circuit block storage unit 32, among which circuit blocks, the search unit 24 searches for the circuit block that satisfies a condition specified by the search operation.

The storage 30 includes a program storage unit 31, the circuit block storage unit 32, and the used device storage unit 33.

The program storage unit 31 stores the ladder program created by the program creation unit 21.

The circuit block storage unit 32 stores the information representing the circuit block that is extracted from the ladder program by the circuit block extraction unit 22.

The used device storage unit 33 stores the information on the device used for each of the plurality of program elements included in the circuit block extracted by the circuit block extraction unit 22. That is to say, the used device storage unit 33 stores the device that is the internal memory assigned to each of the plurality of program elements. The used device storage unit 33 is a used memory information storage unit.

The display unit 40 displays various screens for the user who uses the design support device 1.

Figure 3:
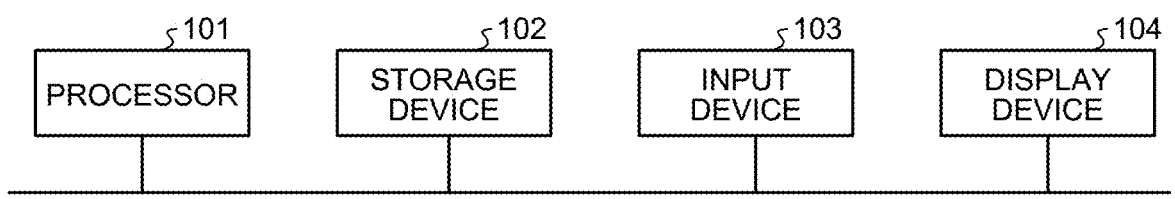
FIG. 3 is a diagram illustrating an example of the configuration of hardware for implementing the design support device according to the first embodiment.

Here, hardware for implementing the design support device 1 according to the first embodiment will be described. FIG. 3 is a diagram illustrating an example of the configuration of the hardware for implementing the design support device 1 according to the first embodiment. The design support device 1 is implemented by a processor 101, a storage device 102, an input device 103, and a display device 104. The hardware illustrated in FIG. 3 is a personal computer, for example. In the case where the hardware illustrated in FIG. 3 is the personal computer, the design support device 1 is implemented by installing a program to operate as the controller 20 of the design support device 1 in a storage device of the personal computer, that is, the storage device 102 illustrated in FIG. 3, and running the installed program on the processor 101. That is, the program creation unit 21, the circuit block extraction unit 22, the notification unit 23, and the search unit 24 illustrated in FIG. 1 are implemented by the processor 101 executing the program installed in the storage device 102 to operate as the controller 20 of the design support device 1.

The processor 101 is a central processing unit (CPU) or the like, the CPU being also referred to as a central processor, a processing unit, an arithmetic unit, a microprocessor, a microcomputer, a processor, or a digital signal processor (DSP). The storage device 102 is a non-volatile or volatile semiconductor memory such as a random access memory (RAM), a read only memory (ROM), or a flash memory, a magnetic disk, or the like. The storage device 102 holds the program for the processor 101 to operate as the design support device 1 and various other data. The storage device 102 is also used as a work memory when the processor 101 executes various processings. Moreover, the storage device 102 includes the storage 30 illustrated in FIG. 1, that is, the program storage unit 31, the circuit block storage unit 32, and the used device storage unit 33.

The input device 103 is a mouse, a keyboard, a touch panel, or the like and includes the operation reception unit 10 illustrated in FIG. 1. The display device 104 is a liquid crystal monitor, a display, or the like and includes the display unit 40 illustrated in FIG. 1.

Note that the above program for operating as the controller 20 of the design support device 1 is, for example, written on a recording medium such as a compact disc (CD)-ROM or a digital versatile disc (DVD)-ROM to be supplied to the user, and is installed in the storage device 102 by the user. In this case, the hardware for implementing the design support device 1 includes a reading device that reads the program from the recording medium or an interface circuit that connects the reading device. Alternatively, the above program may be provided to the user via a communication line such as the Internet and installed in the storage device 102.

Next, the operation of the design support device 1, specifically, the operation that helps the user design the ladder program will be described.

First, a description will be made as to an outline of the operation of the design support device 1 helping the user design the ladder program. When the operation reception unit 10 receives an operation of creating the ladder program from the user, the program creation unit 21 of the design support device 1 creates the ladder program in accordance with the contents of the operation received. The "creation" means that the program creation unit 21 updates the contents of the ladder program during the design phase in accordance with the contents of the operation received by the operation reception unit 10. The circuit block extraction unit 22 monitors a state of the ladder program created by the program creation unit 21. Then, when the circuit block extraction unit 22 finds a circuit block that has not been extracted in the ladder program created (updated) by the program creation unit 21, the circuit block extraction unit 22 extracts that found circuit block and stores information representing the extracted circuit block in the circuit block storage unit 32 of the storage 30. When the operation reception unit 10 receives, from the user, an operation of inserting the circuit block into the ladder program created by the program creation unit 21, the notification unit 23 causes the display unit 40 to display the frequently used circuit blocks among the circuit blocks represented by the information held in the circuit block storage unit 32. These frequently used circuit blocks are displayed as candidates to be inserted into the ladder program. When the operation reception unit 10 receives, from the user, an operation of selecting one of the candidates displayed on the display unit 40, the program creation unit 21 inserts, into the ladder program, the circuit block selected by the user.

Figure 4:
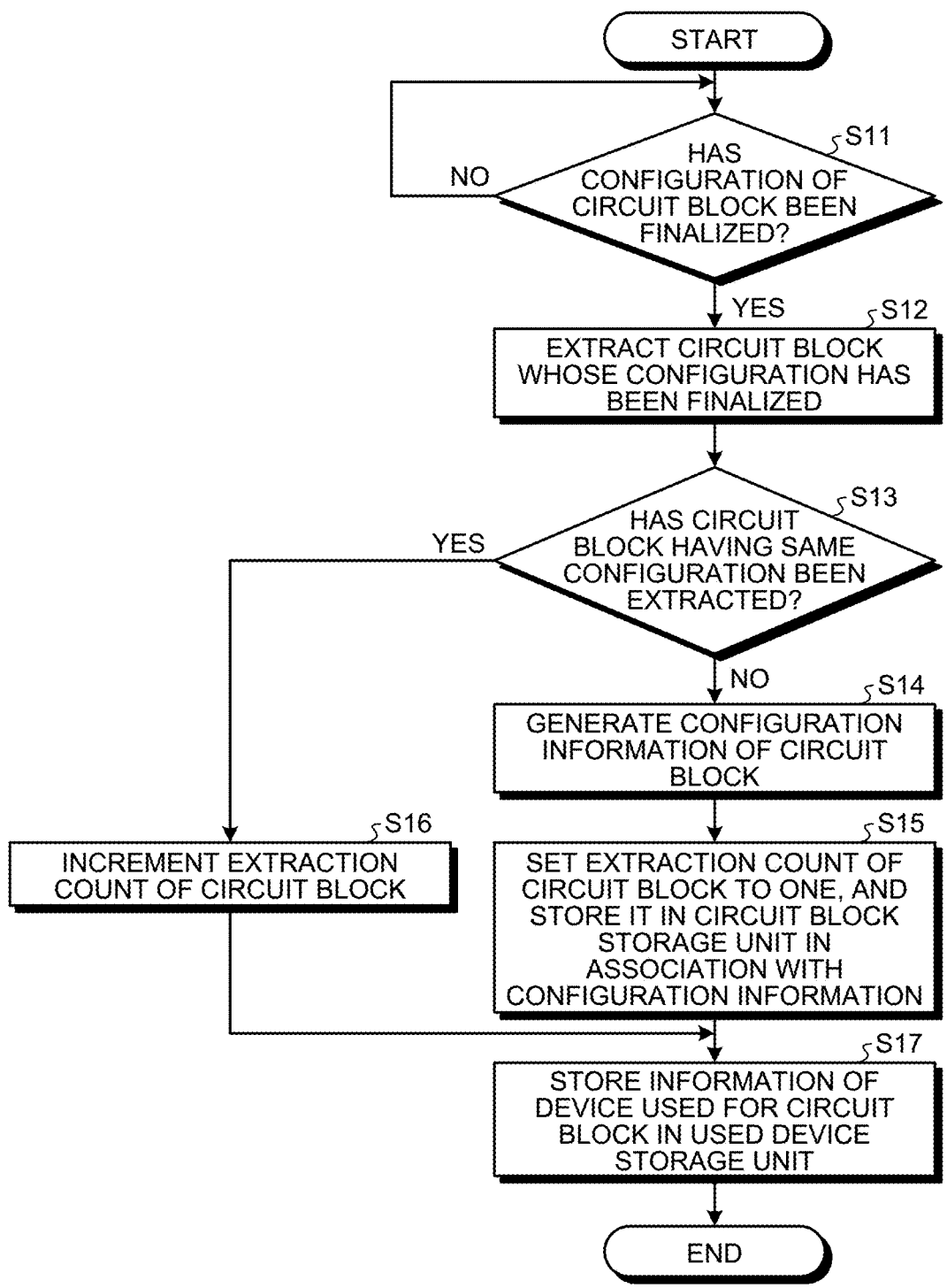
FIG. 4 is a flowchart illustrating an example of the operation of a circuit block extraction unit in the design support device according to the first embodiment.

Next, the operation of the circuit block extraction unit 22 will be described. FIG. 4 is a flowchart illustrating an example of the operation of the circuit block extraction unit 22 in the design support device 1 according to the first embodiment.

The circuit block extraction unit 22 checks the state of the ladder program created by the program creation unit 21 at a predetermined timing, and determines whether or not the configuration of the circuit block has been finalized (step S11). The circuit block extraction unit 22 checks the state of the ladder program when, for example, the operation reception unit 10 has received an operation from the user. The circuit block extraction unit 22 may repeatedly check the state of the ladder program at a predetermined cycle.

Figure 5:
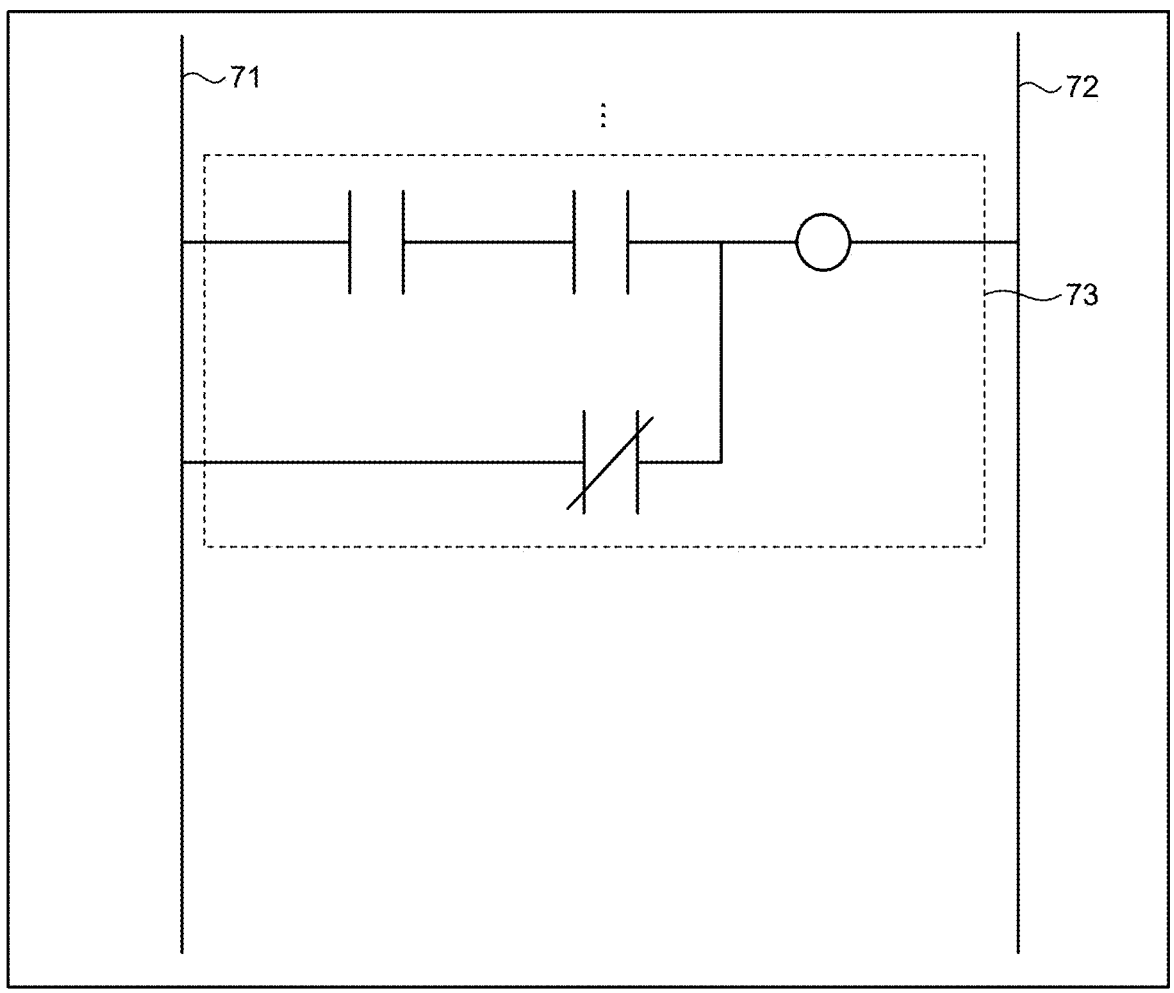
FIG. 5 is a first diagram for explaining the operation of the circuit block extraction unit.
Figure 6:
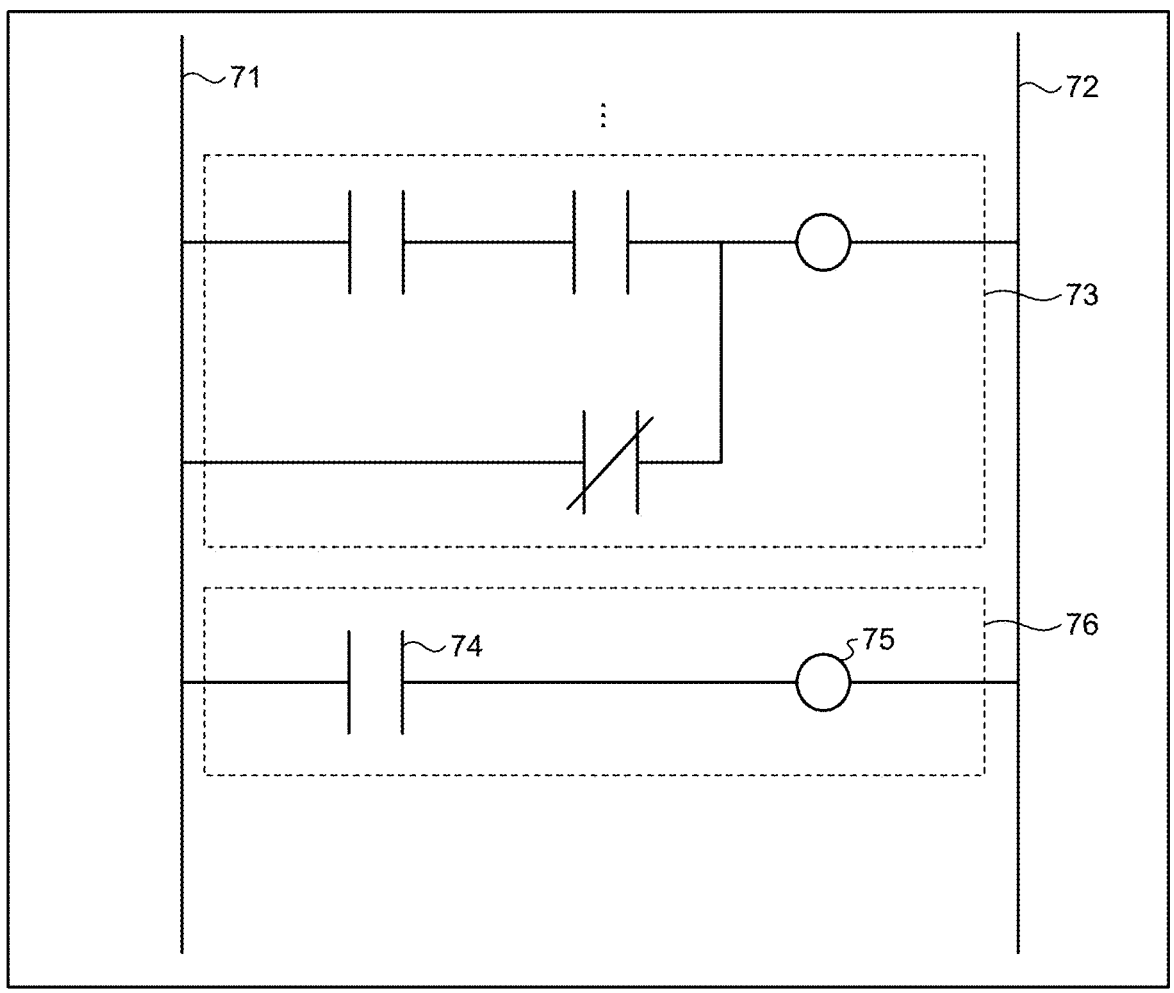
FIG. 6 is a second diagram for explaining the operation of the circuit block extraction unit.

An example of a method through which the circuit block extraction unit 22 determines whether or not the configuration of the circuit block has been finalized will be described with reference to FIGS. 5 and 6. Assume that the program creation unit 21 has created the ladder program in accordance with an operation from the user, and a circuit block 73 illustrated in FIG. 5 has been input. Assume that the program creation unit 21 has further proceeded with creating the ladder program in accordance with an operation from the user, and a contact 74 and a coil 75 have been input and connected to both of two power rails 71 and 72 to form a circuit block 76. In this case, the circuit block extraction unit 22 determines that the configuration of the circuit block 73, which was input immediately before the formation of the circuit block 76, has been finalized. That is, the circuit block extraction unit 22 determines in step S11 illustrated in FIG. 4 whether or not a new circuit block has been formed. Note that the example has been illustrated in which, when a new circuit block has been formed, the circuit block extraction unit 22 determines that the configuration of the circuit block input immediately before the new circuit block has been finalized, but the determination method is not limited to this example. The circuit block extraction unit 22 may determine that the configuration of the newly formed circuit block has been finalized at a point of time a certain time has elapsed since the formation of the new circuit block without such an operation of changing the configuration of the newly formed circuit block as adding a program element and deleting a program element. In this case, the circuit block extraction unit 22 determines in step S11 illustrated in FIG. 4 whether or not a certain time has elapsed since the last operation of changing the configuration of the newly formed circuit block. Also, the circuit block extraction unit 22 determines that the configuration of the circuit block formed last has been finalized when an operation of saving the ladder program being created is performed.

The circuit block extraction unit 22 continues executing step S11 if the configuration of the circuit block has not been finalized, that is, if a new circuit block has not been formed (No in step S11).

If the configuration of the circuit block has been finalized (Yes in step S11), the circuit block extraction unit 22 extracts the circuit block whose configuration has been finalized (step S12). Next, the circuit block extraction unit 22 determines whether or not a circuit block having the same configuration as the extracted circuit block has already been extracted, that is, whether or not a circuit block having the same configuration as the extracted circuit block has been extracted in the past (step S13). By checking configuration information stored in the circuit block storage unit 32, the circuit block extraction unit 22 determines whether or not a circuit block having the same configuration as the circuit block having the configuration finalized has already been extracted. The configuration information stored in the circuit block storage unit 32 is information indicating the configuration of the circuit block.

If a circuit block having the same configuration as the extracted circuit block has not already been extracted (No in step S13), the circuit block extraction unit 22 generates configuration information indicating the configuration of the extracted circuit block (step S14). The circuit block extraction unit 22 further sets an extraction count for the extracted circuit block to one, and stores the extraction count in the circuit block storage unit 32 in association with the configuration information generated in step S14 (step S15). The extraction count indicates a usage count that is the number of times the circuit block having the same configuration as the circuit block extracted by the circuit block extraction unit 22 is used in the ladder program.

Figures 7, 8:
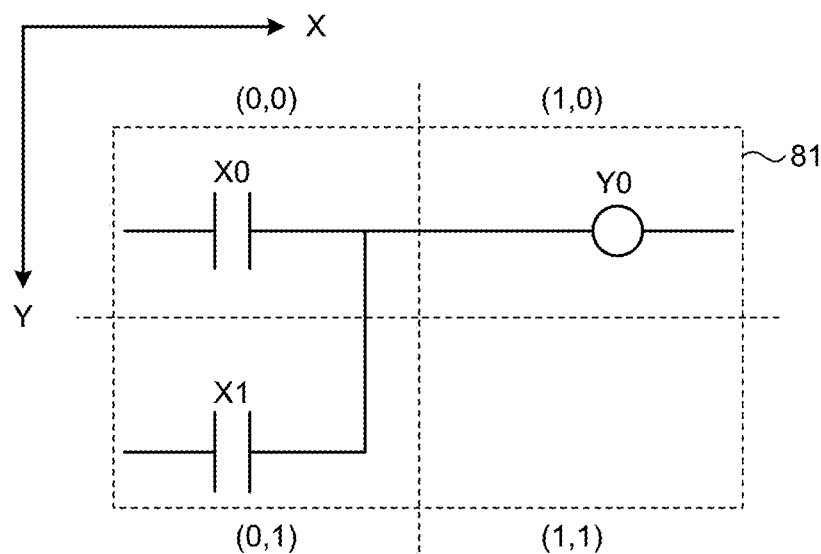
FIG. 7 is a diagram illustrating an example of a circuit block extracted by the circuit block extraction unit.
FIG. 8 is a diagram illustrating an example of circuit block information held by the design support device according to the first embodiment.

When extracting a circuit block 81 with the configuration illustrated in FIG. 7 in step S12, for example, the circuit block extraction unit 22 stores circuit block information 83 illustrated in FIG. 8 in the circuit block storage unit 32 in steps S14 and S15. The circuit block information 83 includes configuration information 83A and an extraction count 83B. The configuration information 83A defines coordinates having the origin at an upper left of the circuit block 81, an X axis in a horizontal direction, and a Y axis in a vertical direction, as illustrated in FIG. 7, and indicates which program element is located at which position on an XY coordinate plane. For convenience of explanation, FIG. 8 illustrates an example in which the type and connection relationship of the program element placed at each coordinate is represented by symbols, but the type of the program element may be represented by a numerical value or the like.

If a circuit block having the same configuration as the extracted circuit block has already been extracted (Yes in step S13), the circuit block extraction unit 22 increments the extraction count for the circuit block having the same configuration (step S16). A specific example of the operation executed by the circuit block extraction unit 22 in step S16 will be described. Assume that the circuit block extraction unit 22 extracts the circuit block 81 illustrated in FIG. 7 in step S12, and the circuit block information 83 illustrated in FIG. 8 is stored in the circuit block storage unit 32. In this case, the circuit block extraction unit 22 increments the extraction count 83B of the circuit block information 83 in step S16.

Figures 9, 10:
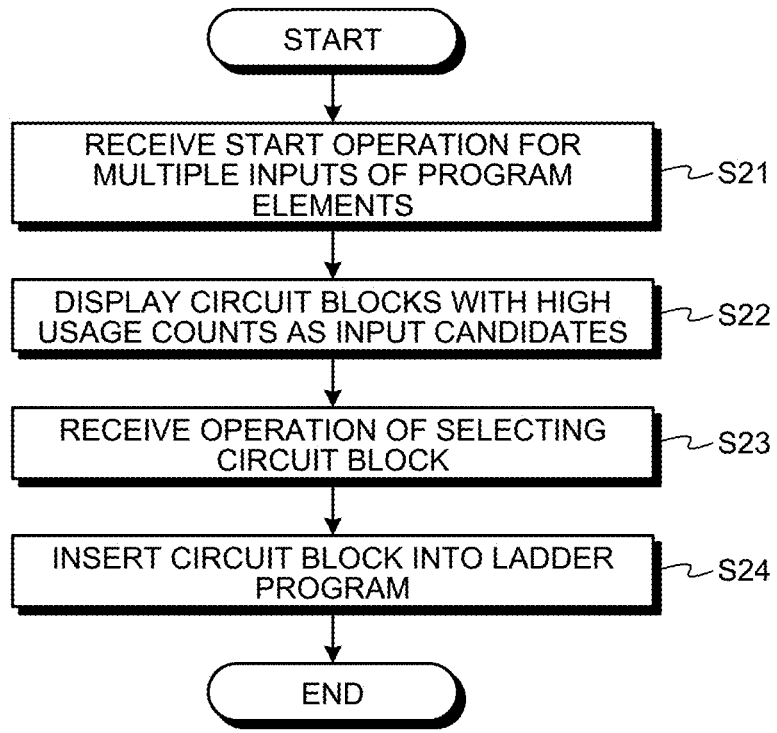
FIG. 9 is a diagram illustrating an example of a used device table that is held by the design support device according to the first embodiment.
FIG. 10 is a flowchart illustrating an example of an operation in which the design support device according to the first embodiment receives input of circuit blocks.

After executing step S15 or S16, the circuit block extraction unit 22 stores, in the used device storage unit 33, information on a device used in the extracted circuit block, that is, information on a device assigned to each of the program elements included in the extracted circuit block (step S17). In step S17, for example, the circuit block extraction unit 22 generates a used device table 85 illustrated in FIG. 9 and stores the generated, used device table in the used device storage unit 33. In FIG. 9, X0, X1, X2, X3, . . . , Y0, Y1, Y2, Y3, . . . represent devices. Number '1' or '0' to the right of the device is a flag associated with each device and indicates a status of use of the device. The example illustrated in FIG. 9 indicates that the device is already in use when the flag is set to '1', and that the device is unused when the flag is set to '0'. The contents of the used device table 85 illustrated in FIG. 9 correspond to the case where the circuit block extraction unit 22 extracts the circuit block 60 illustrated in FIG. 2. Accordingly, in the used device table 85, the flag associated with each of the device X0 assigned to the contact 63, the device X1 assigned to the contact 64, and the device Y0 assigned to the coil 65 is set to '1' indicating that the device is in use. Note that when the circuit block extraction unit 22 further extracts a circuit block whose configuration has been finalized after generating the used device table 85 illustrated in FIG. 9, the circuit block extraction unit 22 in step S17 updates the used device table 85 that has been created. That is, the circuit block extraction unit 22 sets each flag associated with each device used in the extracted circuit block to '1'.

As described above, when detecting that a new circuit block is connected to both of the two power rails, the circuit block extraction unit 22 determines that the configuration of the circuit block connected to both of the two power rails immediately before the new circuit block has been finalized. The circuit block extraction unit 22 then generates the circuit block information indicating the configuration and the extraction count of the circuit block whose configuration has been finalized, and stores the circuit block information in the circuit block storage unit 32. Furthermore, the circuit block extraction unit 22 generates the used device table as the information on the devices used in the circuit block whose configuration has been finalized, and stores the used device table in the used device storage unit 33.

Next, the operation when the design support device 1 receives input of circuit blocks from the user will be described. FIG. 10 is a flowchart illustrating an example of the operation through which the design support device 1 according to the first embodiment receives input of circuit blocks.

When the design support device 1 receives an operation of starting to input multiple the program elements (an operation of inputting a circuit block) from the user who creates the ladder program (step S21), circuit blocks with high usage counts are displayed as input candidates on the display unit 40 (step S22).

Figure 11:
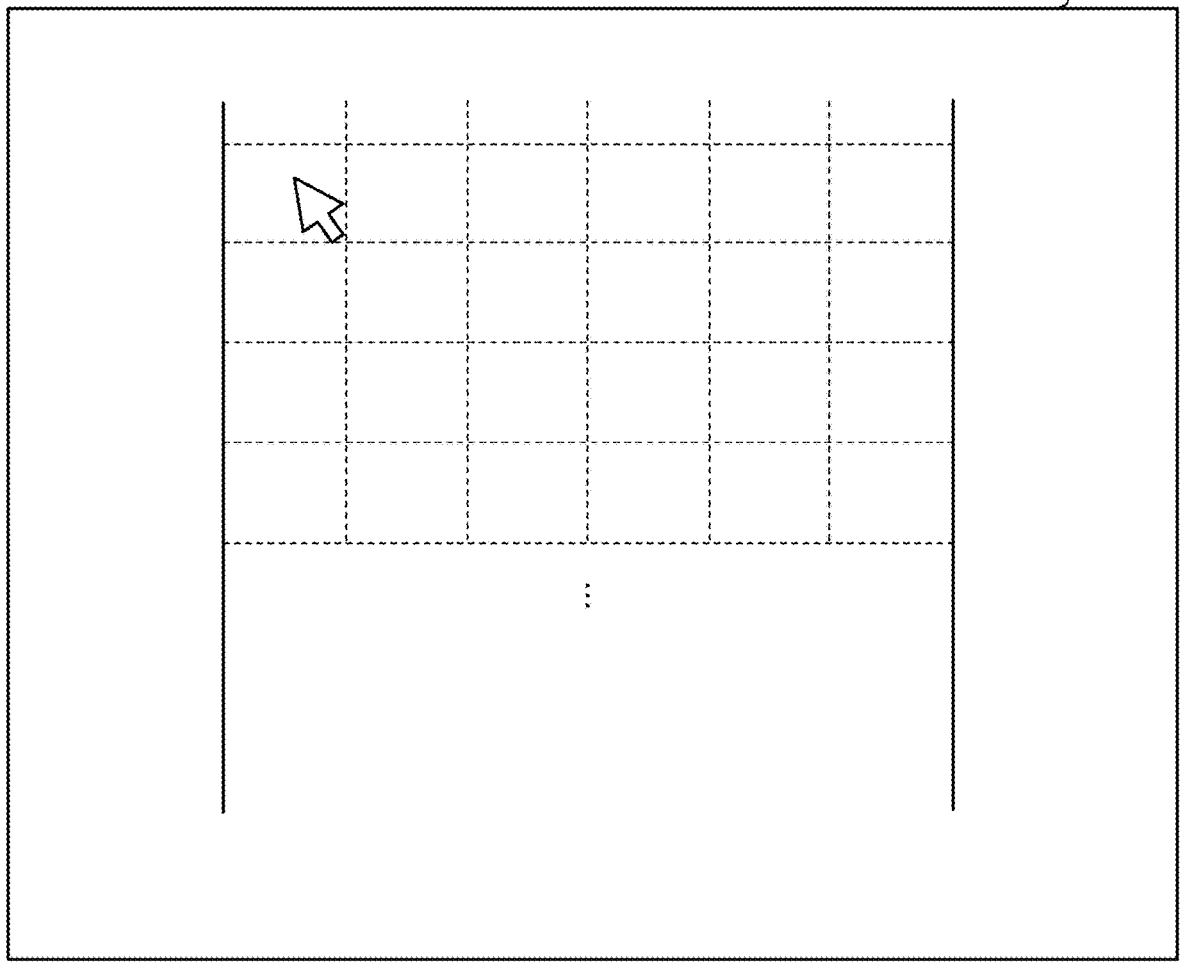
FIG. 11 is a diagram illustrating a first example of a ladder program creation screen.
Figure 12:
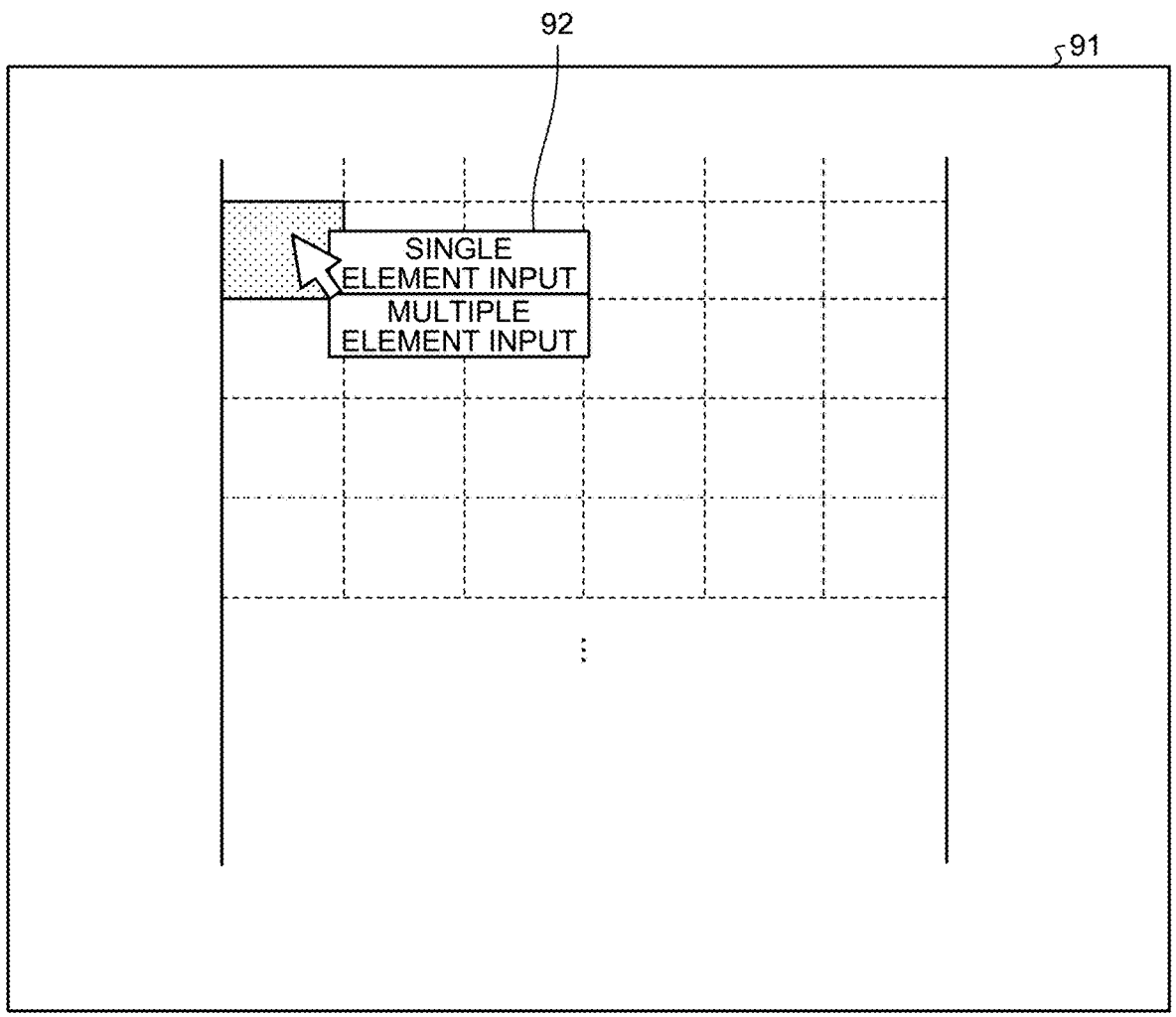
FIG. 12 is a diagram illustrating a second example of the ladder program creation screen.
Figure 13:
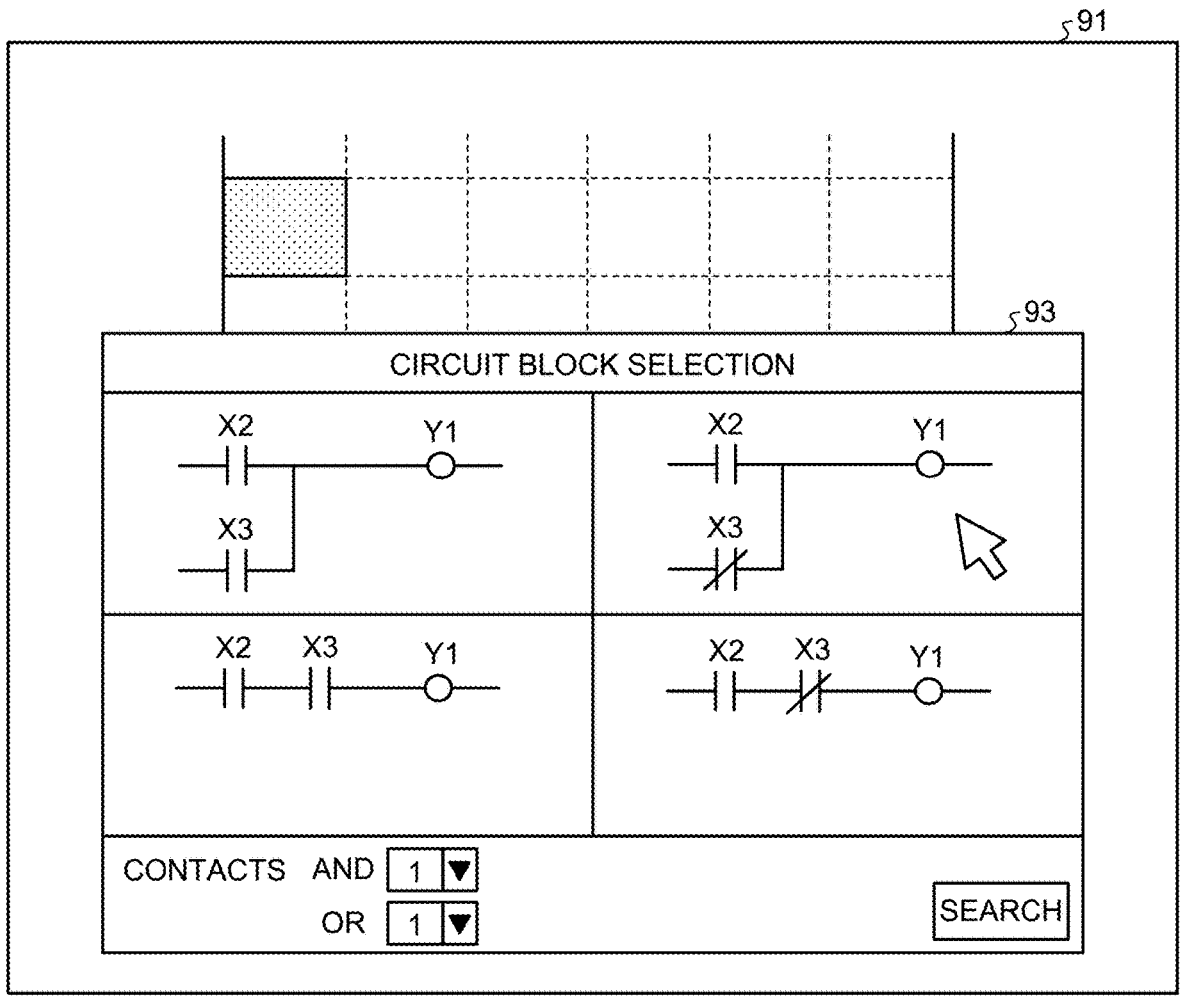
FIG. 13 is a diagram illustrating a third example of the ladder program creation screen.

In step S21, for example, with a ladder program creation screen 91 displayed on the display unit 40, as illustrated in FIGS. 11 and 12, the operation reception unit 10 of the design support device 1 receives an operation of specifying the position at which to input the program element. The design support device 1 then causes the display unit 40 to display a menu 92 that requests selection from the input of a single program element and the input of a plurality of program elements. In the menu 92, "single element input" corresponds to the input of a single program element, and "multiple element input" corresponds to the input of a plurality of program elements (circuit block). When receiving an operation of selecting the "multiple element input", the design support device 1 executes step S22 and causes the display unit 40 to display a screen 93 for receiving a circuit block selection operation as illustrated in FIG. 13. In step S22, the notification unit 23 causes the screen 93 to display circuit blocks with high usage counts among the circuit blocks indicated by the circuit block information stored in the circuit block storage unit 32. In the example illustrated in FIG. 13, the top-four circuit blocks in usage count are displayed on the screen 93. Note that when there is a plurality of circuit blocks with the same usage count, for example, the circuit block with the shorter elapsed time since the last usage is ranked higher. Moreover, when causing the display unit 40 to display the screen 93, the notification unit 23 assigns an unused device to each program element included in each circuit block being the input candidate, and causes the assigned device to be displayed together with the program element. At this time, the notification unit 23 checks the used device table stored in the used device storage unit 33, and assigns unused devices to the program elements in ascending order. Note that FIG. 13 is a display example when the devices X0, X1, and Y0 are used. In the example illustrated in FIG. 13, the top-four circuit blocks in usage count are displayed, but the design support device 1 may display five or more circuit blocks. The design support device 1 may also be adapted to receive, from the user, an operation of scrolling the display of the screen 93 and, when having received this operation, may display, on the screen 93, a circuit block other than the top-four circuit blocks in usage count.

Figure 14:
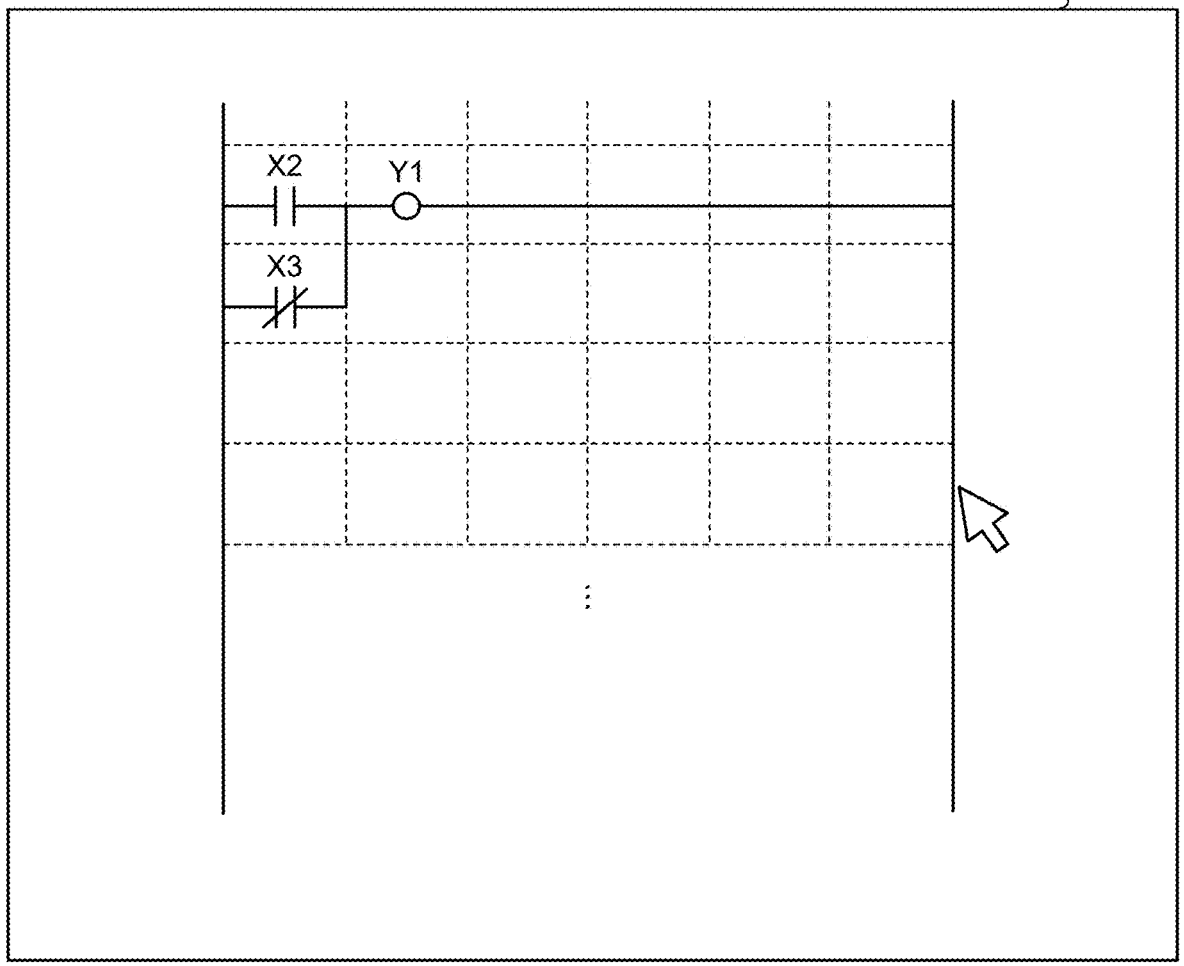
FIG. 14 is a diagram illustrating a fourth example of the ladder program creation screen.

Returning to the explanation of FIG. 10, after executing step S22, the design support device 1 receives, from the user, an operation of selecting one circuit block from among the circuit blocks being the input candidates (step S23), and inserts the selected circuit block into the ladder program (step S24). For example, when a circuit block displayed in the upper right of the screen 93 in FIG. 13 is selected, the program creation unit 21 of the design support device 1 inserts the selected circuit block to the position specified in step S21 above. As a result, the ladder program creation screen 91 is updated to provide the contents illustrated in FIG. 14.

The design support device 1 also performs the operation according to the flowchart illustrated in FIG. 4 in parallel with the operation according to the flowchart illustrated in FIG. 10. In the design support device 1, with the insertion of the circuit block in step S24 above, the circuit block extraction unit 22 determines that the configuration of the circuit block has been finalized, thereby executing step S12 and the subsequent steps illustrated in FIG. 4 to update the usage count of the circuit block whose configuration has been finalized. Note that when the circuit block is inserted in step S24 above, the circuit block extraction unit 22 determines that the configuration of the circuit block formed immediately before the inserted circuit block has been finalized, and updates the usage count.

While the screen 93 illustrated in FIG. 13 is displayed on the display unit 40 as a result of the execution of step S22, moreover, the design support device 1 can search the circuit blocks indicated by the corresponding circuit block information stored in the circuit block storage unit 32, among which circuit blocks the design support device 1 can search for circuit blocks satisfying a condition specified by the user.

Next, a description will be made of the operation through which the design support device 1 searches the circuit blocks used in the past and indicated by the corresponding circuit block information stored in the circuit block storage unit 32, among which circuit blocks the design support device 1 searches for circuit blocks satisfying a condition specified by the user. The search unit 24 searches for the circuit blocks satisfying the condition specified by the user.

Figure 15:
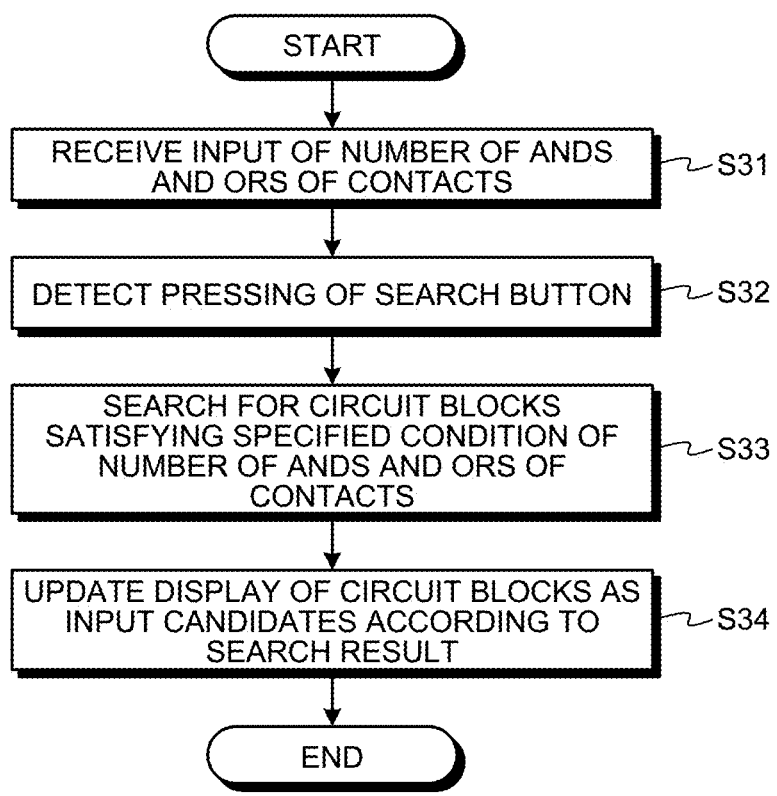
FIG. 15 is a flowchart illustrating an example of an operation through which the design support device according to the first embodiment searches for circuit blocks satisfying a condition.

FIG. 15 is a flowchart illustrating an example of the operation through which the design support device 1 according to the first embodiment searches for the circuit blocks satisfying the condition.

Figure 16:
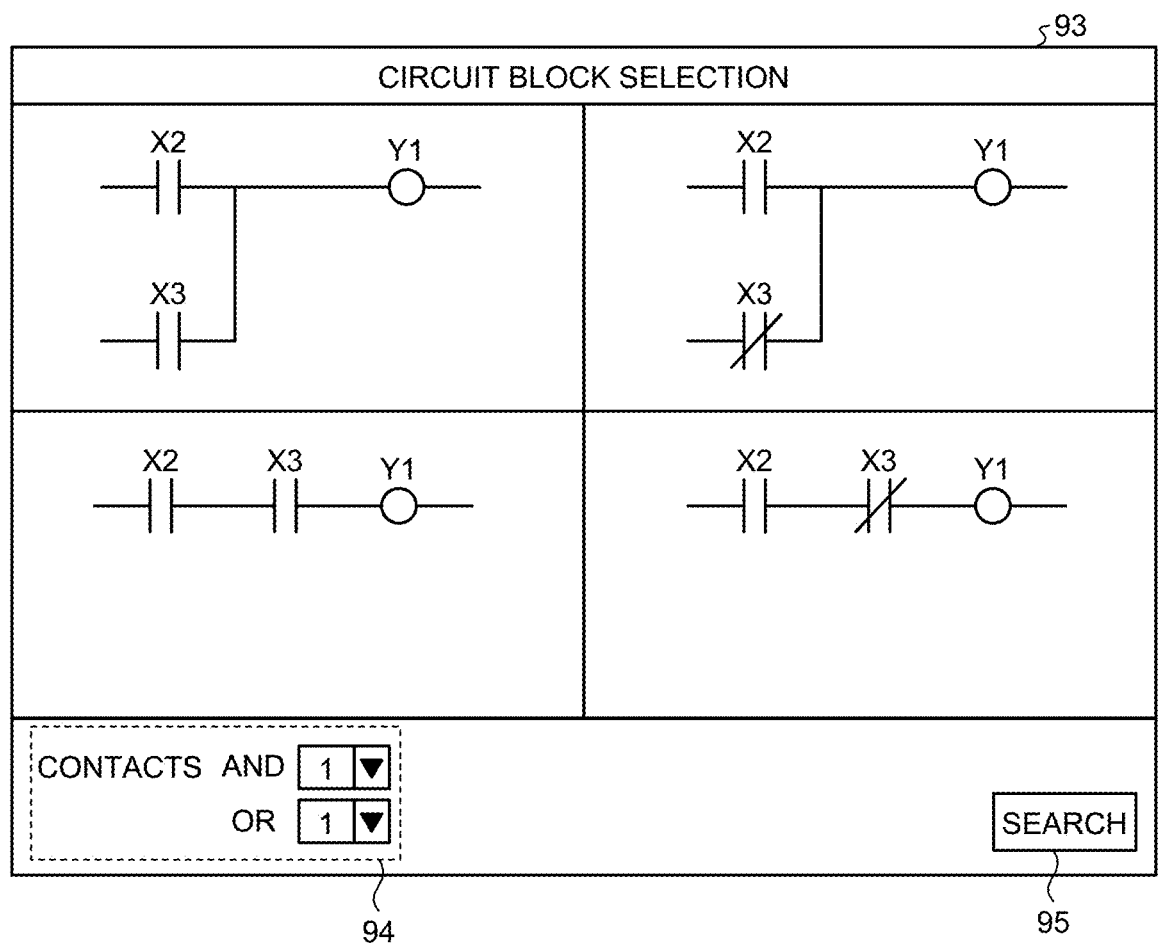
FIG. 16 is a first diagram for explaining the operation that searches for circuit blocks.
Figure 17:
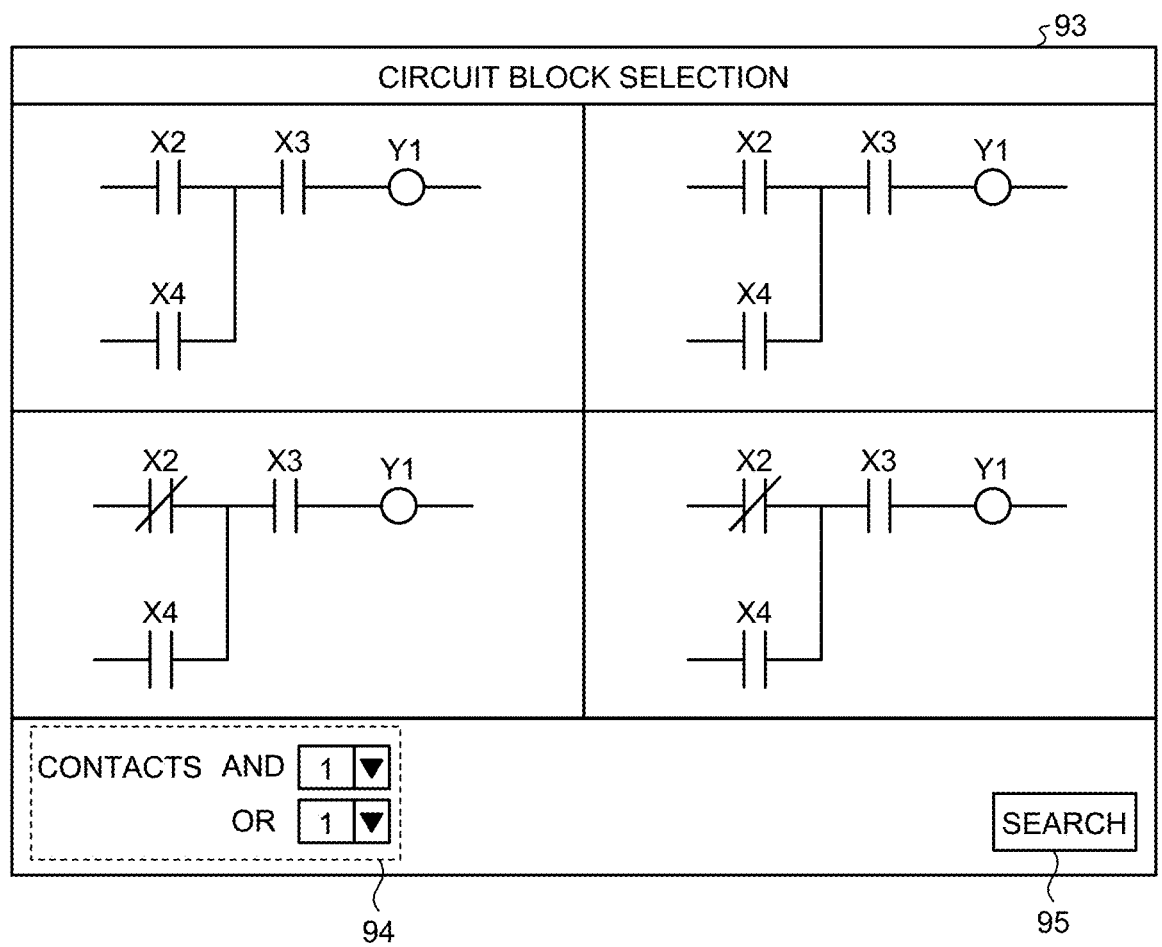
FIG. 17 is a second diagram for explaining the operation that searches for circuit blocks.

Assume that the design support device 1 executes step S22 of FIG. 10 described above, and the screen 93 with the contents illustrated in FIG. 16 is displayed on the display unit 40. At this time, the design support device 1 causes a search condition input area 94 to be displayed at the lower left of the screen 93, and receives, from the user, input of the number of each of ANDs and ORs of the contacts (step S31). After that, when pressing of a search button 95 is detected (step S32), the search unit 24 searches for circuit blocks satisfying a condition of the number of each of ANDs and ORs of the contacts. That is to say, the search unit 24 searches for circuit blocks providing the number of each of ANDs and ORs of the contacts that matches the number input in step S31 (step S33). Specifically, the search unit 24 searches the circuit blocks indicated by the circuit block information stored in the circuit block storage unit 32, among which circuit blocks the search unit 24 searches for circuit blocks providing the number of each of ANDs and ORs of the contacts that satisfies the condition of the number of each of ANDs and ORs. When the search is finished, the search unit 24 notifies the notification unit 23 of a search result. In accordance with the search result obtained from the search unit 24, the notification unit 23 updates the display of the input candidates for the circuit blocks (step S34). Specifically, the notification unit 23 displays, on the screen 93, the circuit blocks with high usage counts among the circuit blocks found by the search by the search unit 24, that is, among the circuit blocks satisfying the condition input in step S31 above. For example, when the input of a condition that "the number of ANDs of the contacts is one and the number of ORs of the contacts is one" is received in step S31 above, the notification unit 23 updates the screen 93 to provide the contents illustrated in FIG. 17.

After that, the design support device 1 waits for selection of the circuit block as the input candidate displayed on the screen 93, or waits for input of the circuit block search condition (the number of each of ANDs and ORs of the contacts). When receiving, from the user, an operation of selecting one of the circuit blocks as the input candidates, the design support device 1 inserts the selected circuit block into the ladder program as described above (that is, performs the processing of steps S23 and S24 in FIG. 10). When the circuit block search condition is input and the search button is pressed, the design support device 1 searches the circuit blocks used in the past, among which circuit blocks the design support device 1 searches for circuit blocks satisfying the search condition, and updates the display on the screen 93 (that is, performs the processing of steps S31 to S34 illustrated in FIG. 15).

As described above, when the configuration of the circuit block connected to the two power rails of the ladder program has been finalized, the design support device 1 according to the present embodiment extracts, from the ladder program, the circuit block whose configuration has been finalized, thereby generating and holding the circuit block information that indicates the configuration of the extracted circuit block and the extraction count of the circuit block having the same configuration as the extracted circuit block. Moreover, when receiving the operation of starting to input multiple program elements, the design support device 1 notifies the user of the circuit blocks with high usage counts as the input candidates among the circuit blocks indicated by the circuit block information. When one of the notified circuit blocks is selected, the design support device 1 inserts the selected circuit block into the ladder program. According to the design support device 1 of the present embodiment, when the plurality of program elements is to be input at a time, the plurality of program elements to be input at a time need not be made into a component in advance so that the burden on the operator who designs the ladder program can be reduced.

Second Embodiment

Next, a design support device according to a second embodiment will be described. A functional block configuration of the design support device according to the second embodiment is similar to that of the design support device 1 according to the first embodiment (see FIG. 1). In the present embodiment, a part different from the design support device 1 according to the first embodiment will be described.

Figure 18:
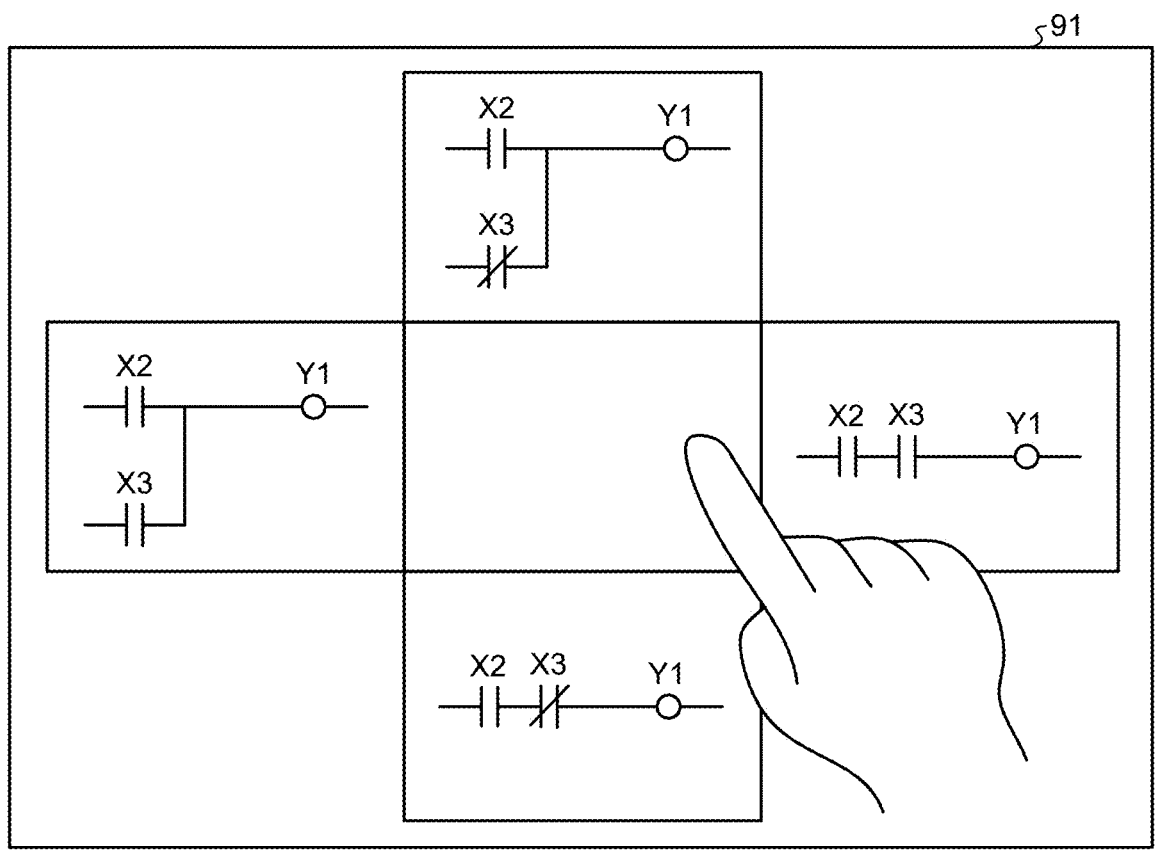
FIG. 18 is a diagram illustrating an example of an operation of inputting a circuit block to a design support device according to a second embodiment.

When the design support device according to the second embodiment detects that the ladder program creation screen 91 displayed on the display unit 40 is touched, the design support device displays a display for flick input of a circuit block as illustrated in FIG. 18. At this time, as in the first embodiment, circuit blocks with high usage counts are displayed as input candidates. Note that the operation reception unit 10 receives the flick input, and the notification unit 23 causes the display unit 40 to provide the display for the flick input of a circuit block.

The design support device according to the second embodiment is similar to the design support device 1 according to the first embodiment except that the method of displaying the circuit blocks as the input candidates and the method of selecting the circuit block are adapted to the flick input. In the design support device according to the second embodiment, the position to which the circuit block is inserted is, for example, a position which a user first touches on the ladder program creation screen 91. Alternatively, the design support device according to the second embodiment may receive the designation of the position to which the circuit block is inserted after the circuit block to be input is selected. The design support device according to the second embodiment may also be adapted to, when detecting that the ladder program creation screen 91 is touched, request a selection from the input of a single program element and the input of a circuit block, and provide the display as illustrated in FIG. 18 when the input of the circuit block is selected.

Note that the design support device according to the present embodiment can receive an input operation similar to that of the first embodiment in addition to the input of a circuit block by the flick operation.

As described above, the design support device according to the second embodiment is configured to receive the input operation using a touch panel, and receives the input of a circuit block by the flick operation. The user can perform an intuitive operation by performing the input by the flick operation. In addition, the user can input a circuit block (a plurality of program elements) without repeatedly performing small finger movements as in the case of inputting a single program element.

Third Embodiment

Next, a design support device according to a third embodiment will be described. As described above, when the design support device 1 according to the first embodiment receives the operation of starting to input a circuit block, the design support device 1 causes the display unit 40 to display a certain number of circuit blocks with high past input counts (usage counts) as the candidates for the circuit block to be input. However, a circuit block that the user is trying to input is not always included in the circuit blocks with high usage counts. Moreover, in the ladder program, there is a certain condition for a circuit block written following a certain circuit block, and thus there is a possibility that the circuit blocks with high usage counts do not satisfy the certain condition. In this case, it is desirable to display, as the input candidate, a circuit block satisfying the certain condition, which, however, is difficult in the case where the input candidate is determined on the basis of the usage count. The design support device according to the present embodiment, therefore, learns the input tendency of the circuit blocks by machine learning and determines the circuit block as the input candidate on the basis of a learning result.

Figure 19:
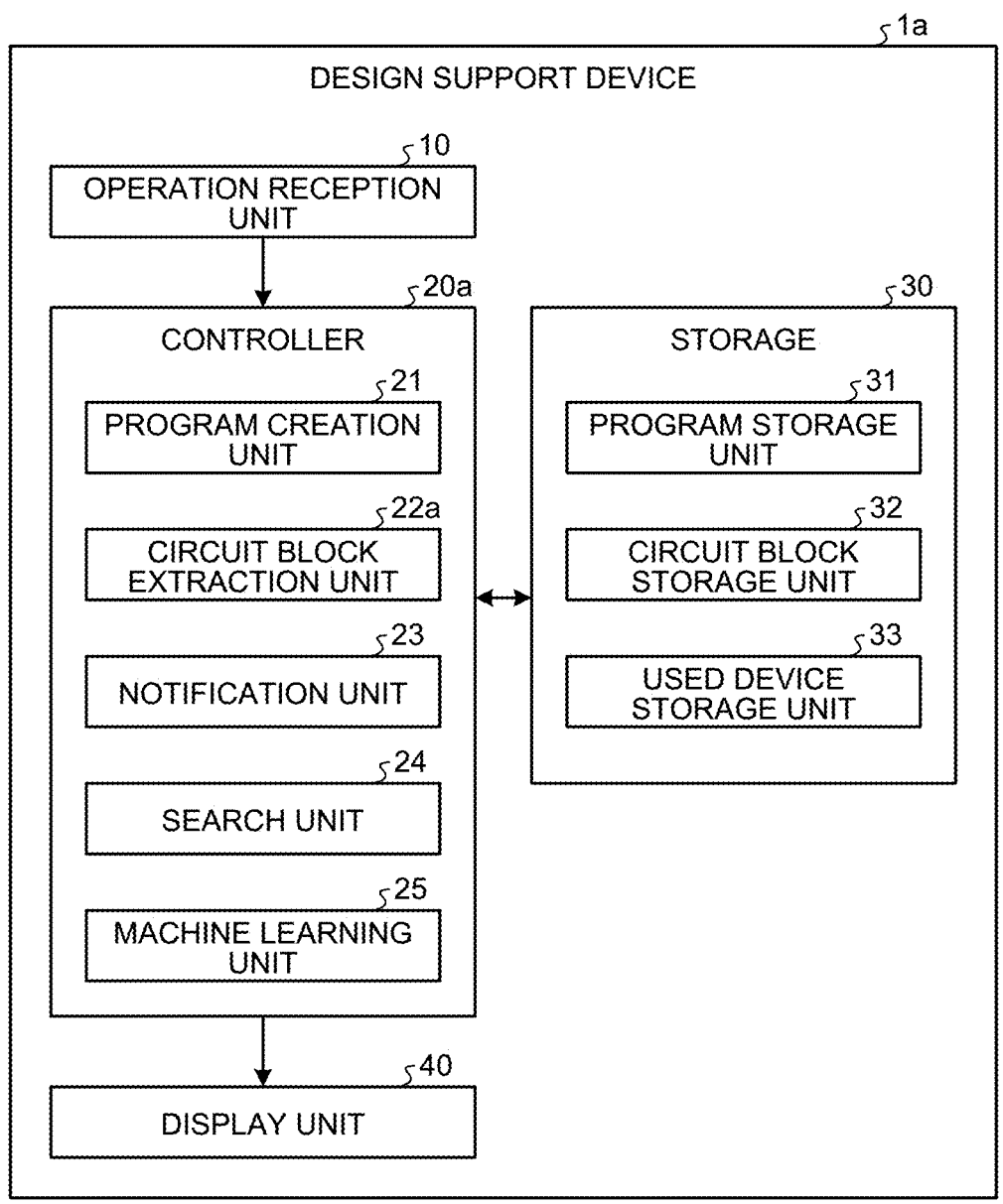
FIG. 19 is a diagram illustrating an example of the configuration of a design support device according to a third embodiment.

FIG. 19 is a diagram illustrating an example of the configuration of the design support device according to the third embodiment. A design support device 1*a* according to the third embodiment includes the operation reception unit 10, a controller 20*a*, the storage 30, and the display unit 40. The operation reception unit 10, the storage 30, and the display unit 40 of the design support device 1*a* will not be described, because they are the same as the operation reception unit 10, the storage 30, and the display unit 40 of the design support device 1 according to the first embodiment. The controller 20*a* of the design support device 1*a* has the configuration in which a machine learning unit 25 is added to the controller 20 of the design support device 1 according to the first embodiment, and the circuit block extraction unit 22 thereof is replaced with a circuit block extraction unit 22*a*.

In FIG. 19, among the components of the design support device 1*a*, the same components as the components of the design support device 1 according to the first embodiment are assigned the same reference numerals as those assigned to the corresponding components of the design support device 1. The same components as the components of the design support device 1 according to the first embodiment will not be described.

Similar to the circuit block extraction unit 22 of the design support device 1 according to the first embodiment, the circuit block extraction unit 22*a* checks a state of a ladder program created by the program creation unit 21 at a predetermined timing to determine whether or not the configuration of a circuit block has been finalized, and extracts the circuit block when the configuration thereof has been finalized. Moreover, when information on the configuration of the extracted circuit block is not held in the circuit block storage unit 32, the circuit block extraction unit 22*a* generates the configuration information and stores the same in the circuit block storage unit 32. However, unlike the circuit block extraction unit 22, the circuit block extraction unit 22*a* does not store, in the circuit block storage unit 32, the extraction count of the circuit block in association with the configuration information. The circuit block storage unit 32 of the design support device 1*a* according to the third embodiment thus holds only the configuration information on the circuit block extracted by the circuit block extraction unit 22*a*.

Figure 20:
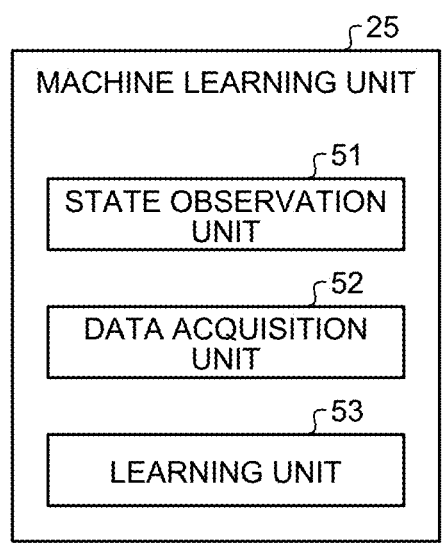
FIG. 20 is a diagram illustrating an example of the configuration of a machine learning unit included in the design support device according to the third embodiment.

FIG. 20 is a diagram illustrating an example of the configuration of the machine learning unit 25 included in the design support device 1*a* according to the third embodiment. The machine learning unit 25 includes a state observation unit 51, a data acquisition unit 52, and a learning unit 53.

When a circuit block is inserted into the ladder program, the state observation unit 51 observes the circuit block that was inserted last time, as a state variable. The insertion of the circuit block means both to insert the circuit block by inputting a plurality of program elements individually and forming the circuit block, and to insert the circuit block by selecting one of the circuit block candidates as described using FIGS. 10 to 14 in the first embodiment. Note that in the following description, "insertion of the circuit block into the ladder program" will be expressed as "input of the circuit block".

When the circuit block is input to the ladder program, the data acquisition unit 52 acquires data related to the input circuit block. The data related to the circuit block, which need only be information uniquely indicating the input circuit block, are, for example, configuration information on the circuit block, or a control number of the circuit block.

The learning unit 53 learns the input tendency of the circuit blocks on the basis of a data set that is created by combining the state variable observed by the state observation unit 51 and the data related to the circuit block acquired by the data acquisition unit 52. The data set is data in which the state variable and the data related to the circuit block are associated with each other.

Note that the present embodiment describes an example in which the controller 20a of the design support device 1a includes the machine learning unit 25, but the present invention is not limited to this configuration. The machine learning unit 25 may be a functional unit independent of the controller 20a, or may be implemented by a device separate from the design support device 1a. Alternatively, the machine learning unit 25 may be implemented by a device on a cloud server. When the machine learning unit 25 is implemented by a device external to the design support device 1a, the design support device 1a transmits the data observed by the state observation unit 51 and the data acquired by the data acquisition unit 52, to the device that implements the machine learning unit 25. The design support device 1a also acquires a learning result of the device that implements the machine learning unit 25.

The learning unit 53 learns the input tendency of the circuit blocks by, for example, so-called supervised learning according to a neural network model. Supervised learning refers to a model that provides a learning device with a large number of data sets each being a set of data of certain input and result (label), learns features found in those data sets, and estimates the result from the input.

The neural network includes an input layer made up of a plurality of neurons, a middle layer (hidden layer) made up of a plurality of neurons, and an output layer made up of a plurality of neurons. The middle layer may be one layer or two or more layers.

In the neural network, when data is input to the corresponding neurons in the input layer, each neuron multiplies the input data by a predetermined weight and inputs the result of this multiplication to each neuron in the middle layer. Similarly, each neuron in the middle layer multiplies the input data by a predetermined weight and inputs the result of this multiplication to each neuron in the output layer. Each neuron in the output layer outputs the data received from the middle layer. This output result varies depending on the value of the weight by which the input data is multiplied at each neuron in the input layer and the middle layer. That is, the neural network performs learning by adjusting the weight by which the data is multiplied at each neuron so as to reduce a difference between the output result and the training data.

The neural network included in the learning unit 53 according to the present embodiment learns the input tendency of the circuit blocks with supervised learning on the basis of a combination of the circuit block input last time and the circuit block input this time. The circuit block input last time is observed by the state observation unit 51. The circuit block input this time is acquired by the data acquisition unit 52. The circuit block input this time serves as the training data. Note that although the circuit block input last time is the target to be observed by the state observation unit 51, such an observation target may also be the circuit block input last time and the circuit blocks input a certain number of times before. For example, the observation target may be the circuit blocks that were input three times, including the circuit block input last time. That is to say, the observation target may be the circuit blocks input three times in the past. By observing a plurality of input circuit blocks, the input tendency of the circuit blocks can be learned more accurately.

In the learning of the neural network included in the learning unit 53, specifically, candidates for the circuit block to be input next by the user are output when the state variable is input. The number of candidates for the circuit block is, for example, four as in the first embodiment. In addition, the circuit blocks are output in order from a circuit block that is highly likely to be selected. Next, the output candidates for the circuit block are compared with the circuit block acquired by the data acquisition unit 52 (the circuit block input this time). On the basis of a result of this comparison, the weight used in each neuron in the input and middle layers of the neural network (the weight by which the input data is multiplied in each neuron) is adjusted. In the weight adjustment, the weight used in each neuron is adjusted such that the circuit block at the top among the candidates for the circuit block, that is, the circuit block most likely to be selected, matches the circuit block input this time (the training data).

The learning unit 53 may learn the input tendency of the circuit blocks in accordance with data sets created for a plurality of the design support devices 1a. Note that the learning unit 53 may acquire the data sets from the plurality of the design support devices 1a. Moreover, the design support device 1a from which the data set is collected can be added to the target or removed from the target along the way. Furthermore, a machine learning device, which is the learning unit 53 that has learned the input tendency of the circuit blocks for one design support device 1a, may be attached to another design support device 1a, and the input tendency of the circuit blocks for the other design support device 1a may be relearned and updated.

Moreover, as a learning algorithm used by the learning unit 53, deep learning that learns extraction of a feature value itself can be used, or another known method such as genetic programming, functional logic programming, or support vector machine may be used to perform machine learning.

Figure 21:
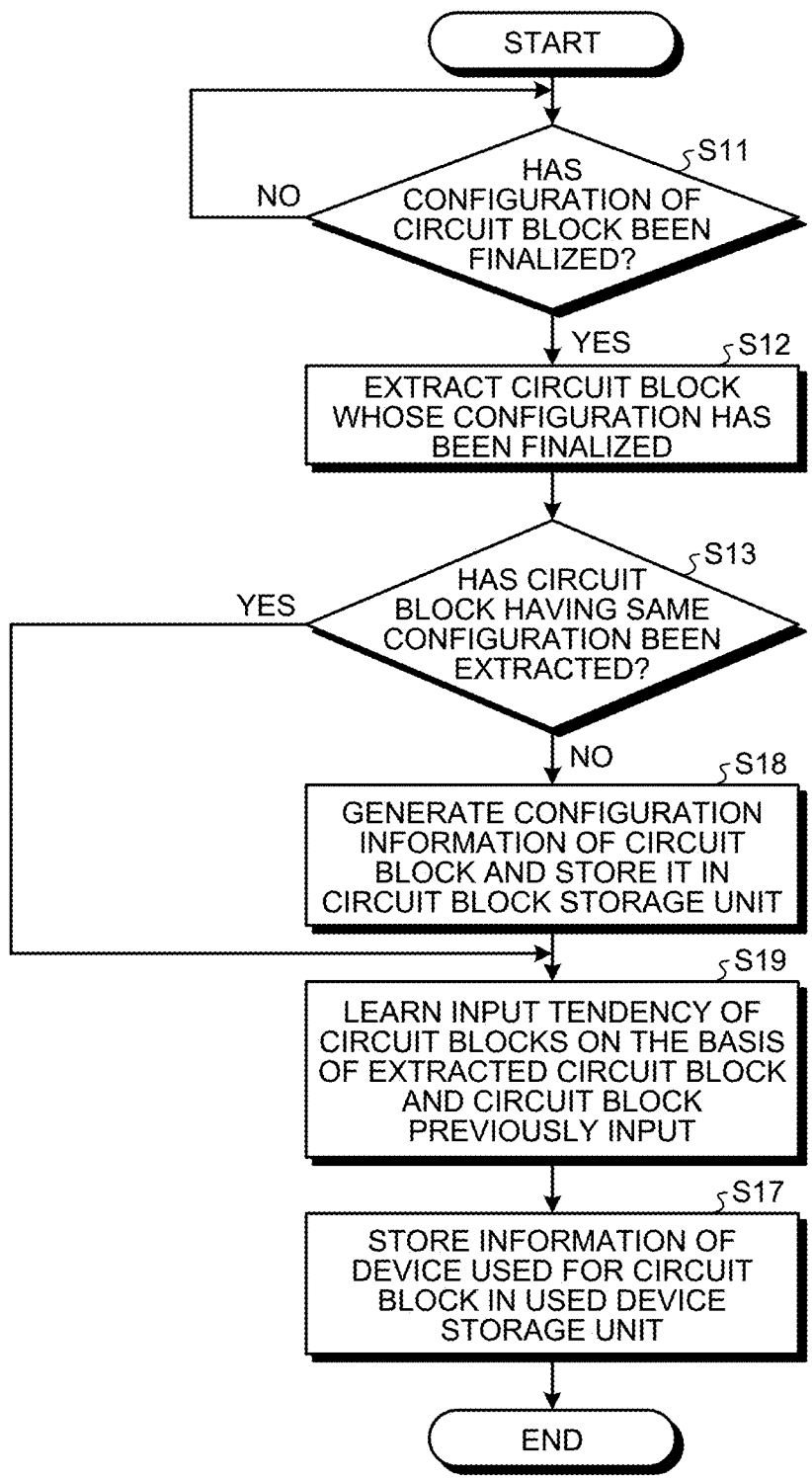
FIG. 21 is a flowchart illustrating an example of an operation through which the design support device according to the third embodiment extracts a circuit block and learns an input tendency of circuit blocks.

Next, the operation of the design support device 1a will be described. FIG. 21 is a flowchart illustrating an example of the operation through which the design support device 1a according to the third embodiment extracts a circuit block and learns the input tendency of the circuit blocks.

The flowchart illustrated in FIG. 21 is obtained by replacing steps S14 and S15 of the flowchart illustrated in FIG. 4 described in the first embodiment with steps S18 and S19. Steps S11 to S13 and S17 will not be described since they are similar to the operations of the corresponding step numbers in FIG. 4 performed by the design support device 1 according to the first embodiment.

If a circuit block having the same configuration as the circuit block extracted in step S12 has not already been extracted (No in step S13), the circuit block extraction unit 22a of the design support device 1a generates configuration information indicating the configuration of the extracted circuit block and stores the configuration information in the circuit block storage unit 32 (step S18).

Next, the design support device 1a learns the input tendency of the circuit blocks on the basis of the circuit block extracted in step S12 and the circuit block input in the past (step S19). In step S19, the machine learning unit 25 learns the input tendency of the circuit blocks from the state variable and the training data. The state variable is a past input circuit block(s) that was input "n" times in the past (where "n" is an integer of 1 or more). The training data is the extracted circuit block that is input this time.

If a circuit block having the same configuration as the circuit block extracted in step S12 has already been extracted (Yes in step S13), the circuit block extraction unit 22a does not execute step S18. In this case, step S19 is executed following step S13.

Figure 22:
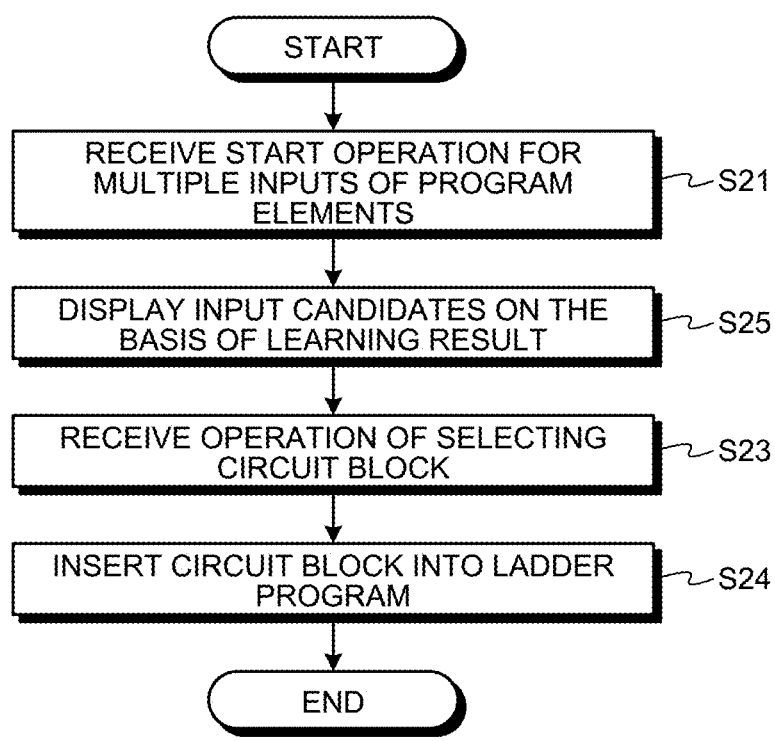
FIG. 22 is a flowchart illustrating an example of an operation through which the design support device according to the third embodiment receives input of circuit blocks.

Next, the operation when the design support device 1a receives input of circuit blocks from the user will be described. FIG. 22 is a flowchart illustrating an example of the operation through which the design support device 1a according to the third embodiment receives input of circuit blocks.

The flowchart illustrated in FIG. 22 is obtained by replacing step S22 of the flowchart illustrated in FIG. 10 described in the first embodiment with step S25. The steps other than step S25 will not be described since they are similar to the operations of the corresponding step numbers in FIG. 10 performed by the design support device 1 according to the first embodiment.

When the design support device 1a receives an operation of starting to input multiple program elements (a start operation for inputting a circuit block) (step S21), circuit blocks as input candidates are displayed on the display unit 40 on the basis of a learning result by the machine learning unit 25 (step S25). In step S25, for example, the machine learning unit 25 determines the circuit blocks as the input candidates on the basis of the learning result and the circuit block input to the ladder program last time, and then the notification unit 23 causes the display unit 40 to display the circuit blocks as the input candidates. As with the design support device 1 according to the second embodiment, the design support device 1a may be capable of receiving input of a circuit block by a flick operation.

As described above, the design support device 1a according to the third embodiment learns the input tendency of the circuit blocks by machine learning on the basis of the past input result of the circuit blocks, and determines the circuit blocks as the input candidates on the basis of the learning result. This can notify the user of the circuit block, which is more likely to be selected, as the input candidate as compared to the first and second embodiments.

Note that the design support device 1a according to the present embodiment determines the circuit blocks as the input candidates by using machine learning instead of the usage count of the circuit block used by the design support device 1 according to the first embodiment, but may be configured to use both the usage count and machine learning. For example, the design support device 1a may display the circuit blocks as the input candidates on the basis of the usage count of the circuit block when the machine learning unit 25 performs insufficient learning, and may display the circuit blocks as the input candidates on the basis of the learning result once the learning is sufficient. Moreover, the user may be allowed to determine whether to display the circuit blocks as the input candidates on the basis of the usage count of the circuit block, or to display the circuit blocks as the input candidates on the basis of the learning result.

The configuration illustrated in the above embodiment merely illustrates an example of the content of the present invention, and can thus be combined with another known technique or partially omitted and/or modified without departing from the scope of the present invention.

REFERENCE SIGNS LIST 1, 1a design support device; 10 operation reception unit; 20, 20a controller; 21 program creation unit; 22, 22a circuit block extraction unit; 23 notification unit; 24 search unit; 25 machine learning unit; 30 storage; 31 program storage unit; 32 circuit block storage unit; 33 used device storage unit; 40 display unit; 51 state observation unit; 52 data acquisition unit; 53 learning unit.

The invention claimed is:

1. A design support device comprising:
operation reception circuitry to receive an operation from a user;
program creation circuitry to create a ladder program in accordance with the operation received by the operation reception circuitry;
circuit block extraction circuitry to determine whether or not a configuration of a circuit block has been finalized under a condition that the circuit block is formed by detecting that one end of a circuit including a plurality of program elements of the circuit block is connected to one of two power rails included in the ladder program and that another end of the circuit is connected to another one of the two power rails, and extract the circuit block from the ladder program when it is determined that the configuration of the circuit block has been finalized;
a circuit block storage to store configuration information representing the configuration of the circuit block extracted by the circuit block extraction circuitry; and
notification circuitry to notify the user of the circuit block represented by the configuration information stored in the circuit block storage, as a candidate for a circuit block to be inserted into the ladder program.

2. The design support device according to claim 1, wherein the, circuit block extraction circuitry determines that the configuration of the circuit block has been finalized when a circuit block is newly formed.

3. The design support device according to claim 1, wherein the circuit block extraction circuitry determines that the configuration of the circuit block has been finalized when a certain time elapses without a new circuit block being formed after the circuit block is formed.

4. The design support device according to claim 1, wherein the circuit block extraction circuitry determines that the configuration of the circuit block has been finalized. when an operation of saving the ladder program is performed after the circuit block is formed and before the circuit block whole configuration is determined to be finalized is extracted from the ladder program.

5. The design support device according to claim 1, wherein
the circuit block storage stores information on a usage count in association with the configuration information, the usage count being the number of times a circuit block having the same configuration as the circuit block extracted by the circuit block extraction circuitry is used in the ladder program, and the notification circuitry notifies the user of a certain number of the circuit blocks with predetermined usage counts as the candidates among the circuit blocks represented by the configuration information stored in the circuit block storage.

6. The design support device according to claim 1, further comprising a machine learning circuitry to learn an input tendency of a circuit block into the ladder program based on a circuit block inserted into the ladder program before and a circuit block newly inserted into the ladder program, wherein the notification circuitry notifies the user of the candidate based on a learning result by the machine learning circuitry.

7. The design support device according to claim 1, wherein the notification circuitry notifies the user of the candidate based on an input tendency of a circuit block into the ladder program that is learned based on a circuit block inserted into the ladder program before and a circuit block newly inserted into the ladder program.

8. The design support device according to claim 1, further comprising a search circuitry to search for a circuit block that satisfies a condition specified by the user, among the circuit blocks represented by the configuration information stored in the circuit block storage, wherein when the search circuitry performs a search, the notification circuitry notifies the user of a circuit block found by the search, as a candidate for a circuit block to be inserted into the ladder program.

9. The design support device according to claim 1, further comprising a used memory information storage to store information on an al memory assigned to each program element included in the circuit block extracted by the circuit block extraction circuitry, wherein the notification circuitry automatically assigns an unused internal memory to each program element included in the circuit block that the user is notified of, the notification circuitry notifying the user of the assigned internal memory in association with the program element.

10. The design support device according to claim I. wherein when the user selects one of the circuit blocks notified by the notification circuitry, the operation reception circuitry receives the selection by a flick operation.

11. A non-transitory storage computer-readable medium storing a design support program that causes a computer to execute:

receiving an operation from a user;

creating a ladder program in accordance with the received operation, the creating of the ladder program including determining whether or not a configuration of a circuit block has been finalized under a condition that the circuit block is formed by detecting that one end of a circuit including a plurality of program elements of the circuit block is connected to one of two power rails included in the ladder program and that another end of the circuit is connected to another one of the two power rails, and extracting the circuit block whose configuration is determined to be finalized from the ladder program;

storing configuration information representing the configuration of the extracted circuit block; and notifying the user of the circuit block represented by the stored configuration information, as a candidate for a circuit block to be inserted into the ladder program.

12. The non-transitory storage computer-readable medium according to claim 11, wherein the design support program causes the computer to execute:

determining that the configuration of the circuit block has been finalized when a circuit block is newly formed.

13. The non-transitory storage computer-readable medium according to claim 11, wherein the design support program causes the computer to execute:

determining that the configuration of the circuit block has been finalized when a certain time elapses without a new circuit block being formed after the circuit block is formed.

14. The non-transitory storage computer-readable medium according to claim 11, wherein the design support program causes the computer to execute:

determining that the configuration of the circuit block has been finalized, when an operation of saving the ladder program is performed after the circuit block is formed and before the circuit block whole configuration is determined to be finalized is extracted from the ladder program.

15. The non-transitory storage computer-readable medium according to claim 11, wherein the design support program causes the computer to execute:

storing information on a usage count in association with the configuration information, the usage count being the number of times a circuit block having the same configuration as the circuit block extracted by said extracting is used in the ladder program, and notifying the user of a certain number of the circuit blocks with predetermined usage counts as the candidates among the circuit blocks represented by the stored configuration information.

16. The non-transitory storage computer-readable medium according to claim 11, wherein the design support program causes the computer to execute:

learning an input tendency of a circuit block into the ladder program based on a circuit block inserted into the ladder program before and a circuit block newly inserted into the ladder program, wherein said notifying the user of the candidate is based on a learning result of said learning the input tendency.

17. The non-transitory storage computer-readable medium according to claim 11, wherein the design support program causes the computer to execute:

notifying the user of the candidate based on an input tendency of a circuit block into the ladder program that is learned based on a circuit block inserted into the ladder program before and a circuit block newly inserted into the ladder program.

18. The non-transitory storage computer-readable medium according to claim 11, wherein the design support program causes the computer o execute:

searching for a circuit block that satisfies a condition specified by the user, among the circuit blocks represented by the configuration information stored by said storing, wherein responsive to said searching, notifying the user of a circuit block found by the search, as a candidate for a circuit block to be inserted into the ladder program.

19. The non-transitory storage computer-readable medium according to claim 11, wherein the design support program causes the computer to execute:

storing information on an internal memory assigned to each program element included in the circuit block extracted by the said extracting, wherein said notifying automatically assigns an unused internal memory to each program element included in the circuit block that the user is notified of, and notifies the user of the assigned internal memory in association with the program element.

20. A design support device comprising:

operation reception circuitry to receive an operation from a user;

program creation circuitry to create a ladder program in accordance with the operation received by the operation reception circuitry;

circuit block extraction circuitry to extract a circuit block from the ladder program under a condition that the circuit block is formed and a predetermined condition is satisfied, and determine whether or not a circuit block having a same configuration as the circuit block having a finalized configuration has already been extracted, the first circuit block being formed by detecting that one end of a circuit including a plurality of program elements of the circuit block is connected to one of two power rails included in the ladder program and that another end of the circuit is connected to another one of the two power rails;

a circuit block storage to store configuration information representing a configuration of the circuit block extracted by the circuit block extraction circuitry; and notification circuitry to notify the user of the circuit block represented by the configuration information stored in the circuit block storage, as a candidate for a circuit block to be inserted into the ladder program, wherein the circuit block extraction circuitry foregoes saving the configuration information representing the configuration of the circuit block in the circuit block storage under a condition that the circuit block having the same configuration as the circuit block having the finalized configuration has already been extracted.

\* \* \* \* \*